US012333909B2

(12) United States Patent
Cong

(10) Patent No.: US 12,333,909 B2
(45) Date of Patent: Jun. 17, 2025

(54) ELECTRONIC GAMING SYSTEMS AND METHODS

(71) Applicant: Aimin Cong, Las Vegas, NV (US)

(72) Inventor: Aimin Cong, Las Vegas, NV (US)

( * ) Notice: Subject to any disclaimer, the term of this patent is extended or adjusted under 35 U.S.C. 154(b) by 0 days.

(21) Appl. No.: 17/963,597

(22) Filed: Oct. 11, 2022

(65) Prior Publication Data

US 2023/0177927 A1 Jun. 8, 2023

Related U.S. Application Data

(63) Continuation of application No. 17/093,972, filed on Nov. 10, 2020, now Pat. No. 11,468,742, which is a continuation of application No. 16/436,950, filed on Jun. 11, 2019, now Pat. No. 10,832,526, which is a continuation of application No. 15/883,090, filed on Jan. 29, 2018, now Pat. No. 10,319,194.

(60) Provisional application No. 62/452,259, filed on Jan. 30, 2017.

(51) Int. Cl.
*G07F 17/32* (2006.01)

(52) U.S. Cl.
CPC ...... *G07F 17/3267* (2013.01); *G07F 17/3209* (2013.01); *G07F 17/3213* (2013.01); *G07F 17/3244* (2013.01)

(58) Field of Classification Search
CPC ............. G07F 17/3267; G07F 17/3209; G07F 17/3213; G07F 17/3244
USPC ............ 463/20
See application file for complete search history.

(56) References Cited

U.S. PATENT DOCUMENTS

| | | | | |
|---|---|---|---|---|
| 7,503,848 B2 * | 3/2009 | Berman | G07F 17/3211 463/19 |
| 7,931,531 B2 * | 4/2011 | Oberberger | G07F 17/32 463/6 |
| 7,950,993 B2 * | 5/2011 | Oberberger | G07F 17/3206 463/16 |
| 8,790,169 B2 * | 7/2014 | Saunders | G07F 17/32 463/2 |
| 2009/0176551 A1 * | 7/2009 | Wilson | G07F 17/3267 463/20 |
| 2013/0237306 A1 * | 9/2013 | Meyer | G07F 17/34 463/20 |
| 2014/0256411 A1 * | 9/2014 | Basallo | G07F 17/34 463/25 |
| 2017/0024955 A1 * | 1/2017 | Pawloski | G07F 17/34 |

* cited by examiner

*Primary Examiner* — Allen Chan
(74) *Attorney, Agent, or Firm* — Newman Law, LLC

(57) ABSTRACT

Systems and method for providing a slot-type game in which a game outcome is reached that includes an active area and an inactive area, with any awards being determined by the position of randomly generated symbols in the active area, the active area increasing in size to include additional positions of randomly generated symbols from the inactive area responsive to an occurrence of a triggering event, wherein the triggering event is based on the satisfaction of a preset criteria associated with the active area of the game outcome, may result in enhanced awards and may be triggered one or more instances thereafter by the satisfaction of the preset criteria associated with the increased active area, each instance of being triggered resulting in the active area increasing in size until a maximum active area is achieved.

20 Claims, 22 Drawing Sheets

ELECTRONIC GAMING SYSTEMS AND METHODS

CROSS-REFERENCE TO RELATED APPLICATIONS

This application claims the priority benefit of U.S. Provisional Patent Application No. 62/452,259 filed Jan. 30, 2017, the disclosure of which is incorporated herein by reference.

BACKGROUND OF THE INVENTION

The invention relates generally to electronic gaming equipment, and more particularly, to an electronic gaming machines, games and special or bonus game features that may be offered to facilitate and encourage game play thereon.

Gaming machines, have become a major source of entertainment in many parts of the world. Traditionally such machines were mechanical devices where a number of reels marked with a plurality of numbers or symbols could be made to spin randomly by the application of some mechanical input. If, upon coming to a rest, the subsequent patterns of numbers or symbols displayed along a "payline" of symbol locations on the reels corresponded to predetermined patterns, then the machine would provide a prize or payout.

At one time a slot machine payline included only straight line arrangements of symbol locations across each cell in the array formed by the reels. The advent of electronics, computers and electronic graphical displays, has enabled a continual increase in the complexity and variations of gaming machines, games and displays, while maintaining the basic concept of the traditional machine. In short, the games no longer include mechanical reels but simulate rotatable reels to ultimately display a array of locations in which a symbol is displayed. These games also typically include multiple paylines many of which are not straight lines, and each cell may comprise a reel, such that every symbol in each cell is randomly selected. However, the paylines remain predefined to include specific arrangements of symbol locations in the reel array.

Bonus games that may be played in conjunction with the underlying slot game are often used to enhance the entertainment value of the game. The bonus game may comprise any type of game, either similar to or completely different from the primary game. The bonus game is typically initiated upon the occurrence of a selected event or outcome of the underlying game, but may also require an additional wager.

To keep games appealing to players there is a continuing need to develop new and interesting features and bonus games for electronic gaming. New features and bonus games appeal to player interest and enhance excitement in order to entice longer play and satisfy demands of operators for interesting games and increased profitability.

SUMMARY OF THE INVENTION

The present disclosure is directed to gaming systems and methods for providing a game in which a game outcome is reached that includes an active area and an inactive area, with any awards being determined by the position of randomly generated symbols in the active area, the active area increasing in size to include additional positions of randomly generated symbols from the inactive area responsive to an occurrence of a triggering event, wherein the triggering event is based on the satisfaction of a preset criteria associated with the active area of the game outcome, may result in enhanced awards and may be triggered one or more instances thereafter by the satisfaction of the preset criteria associated with the increased active area, each instance of being triggered resulting in the active area increasing in size until a maximum active area is achieved.

Some embodiments of the invention are directed to a gaming system, comprising: a housing; at least one display device supported by the housing; a plurality of input devices supported by the housing; at least one processor; and at least one memory device that stores a plurality of instructions that, when executed by the at least one processor, cause the at least one processor to operate with the at least one display device and the plurality of input devices to: (a) establish a credit balance based at least in part on a monetary value associated with a physical item after an input device receives the physical item, the physical item being a ticket associated with the monetary value or currency; (b) place a wager to initiate play of a wagering game in response to receipt of an actuation of a wager button, the credit balance being decreasable by the wager; (c) randomly display an outcome of an instance of play of the wagering game, wherein the displayed game outcome includes one or more symbols of a plurality of symbols in an active symbol display area, the one or more symbols in the active symbol display area being determinative of an award outcome, and one or more symbols of the plurality of symbols in an inactive symbol display area, the one or more symbols in the inactive symbol display area being unused in the determination of the award outcome, the inactive symbol display area being distinguishable from the active symbol display area in the displayed game outcome by at least one identifying characteristic; (d) determine an award outcome based on the plurality of symbols in the active symbol display area, the credit balance being increasable by any determined award outcome; (e) responsive to the detection of an occurrence of a triggering event in the displayed game outcome, wherein the triggering event comprises at least a preset amount of one or more predefined symbols being displayed in a preset configuration in the active symbol display area: (1) modify the displayed game outcome by discontinuing display of the at least one identifying characteristic in at least a portion of the inactive symbol display area; (2) determine an enhanced award outcome associated with the one or more symbols in the active symbol display area of the modified game outcome, the active symbol display area of the modified game outcome including the at least a portion of the inactive symbol display area in which the display of the at least one identifying characteristic is discontinued; and (3) responsive to the detection of an occurrence of a triggering event in the modified game outcome, repeat (1) and (2), whereby the display of the at least one identifying characteristic is discontinued in one or more additional portions of the inactive symbol display area; (f) responsive to at least one of (i) the absence of the detection of an occurrence of a triggering event in the modified game outcome and (ii) the discontinuing of the display of the at least one identifying characteristic in all portions of the inactive symbol display area of the modified game outcome, increase the credit balance being by the determined enhanced award outcome; and (g) initiate a payout of the credit balance in response to receipt of a payout request.

In some embodiments of the aforementioned gaming system the triggering event comprises two or more of the predefined symbols in a preset configuration in the active symbol display area.

In some embodiments of the aforementioned gaming system the triggering event comprises two or more of the predefined symbols adjacently positioned in the active symbol display area.

In some embodiments of the aforementioned gaming system the one or more predefined symbols comprise one or more of the same symbol, and the at least a preset amount of one or more predefined symbols displayed in a preset configuration in the active symbol display area may comprise at least three of the same symbol.

In some embodiments of the aforementioned gaming system the at least one identifying characteristic comprises obscuring at least a portion of the one or more symbols in the inactive symbol display area.

In some embodiments of the aforementioned gaming system, at least one of the preset amount of one or more predefined symbols, the predefined symbols and the preset configuration is selected randomly.

In some embodiments the aforementioned gaming system further comprises displaying the at least one identifying characteristic in all portions of the inactive symbol display area responsive to initiating play of a subsequent instance of the wagering game.

In some embodiments the aforementioned gaming system further comprises continuing to display the inactive symbol display area without the at least one characteristic in one or more subsequent instances of the wagering game responsive to the discontinuing of the display of the at least one identifying characteristic in all portions of the inactive symbol display area of the modified game outcome.

In some embodiments of the aforementioned gaming system the displayed game outcome includes a depiction of virtual reels forming an array of multiple rows and multiple columns defining a plurality of cells therein. The active symbol display area may include a first plurality of cells in the array and the inactive symbol display area may include a second plurality of cells in the array. The triggering event may comprise at least three of the one or more predefined symbols in adjacently positioned cells of the active symbol display area, and the one or more predefined symbols may comprise any of the same symbols. In some embodiments of the aforementioned gaming system, the one or more predefined symbols are removed from the displayed game outcome and replaced by one or more symbols of the plurality of symbols.

In some embodiments, the gaming system further comprises replacing the one or more predefined symbols with one or more symbols of the plurality of symbols in the modified game outcome responsive to an occurrence of the triggering event.

Some embodiments of the invention are directed to a gaming system, comprising: a housing; at least one display device supported by the housing; one or more input devices; at least one processor; and at least one memory device that stores a plurality of instructions that, when executed by the at least one processor, cause the at least one processor to operate with the at least one display device and the one or more input devices to: (a) establish a credit balance associated with a monetary amount through the one or more input devices; (b) receive a wager to initiate play of a wagering game in response to actuation of a wager through the one or more input devices, the credit balance being decreasable by the wager; (c) randomly display an outcome of an instance of play of the wagering game, wherein the displayed game outcome includes symbols from a plurality of symbols in an active symbol display area and symbols from the plurality of symbols in an inactive symbol display area, an award outcome being determined by the plurality of symbols in the active symbol display area, the inactive symbol display area being distinguishable from the active symbol display area in the displayed game outcome by at least one identifying characteristic; (d) determine the award outcome based on the plurality of symbols in the active symbol display area, the credit balance being increasable by the determined award outcome; (e) responsive to an occurrence of a triggering event in the displayed game outcome, wherein the triggering event comprises at least three of a same symbol being displayed in the active symbol display area: (1) modify the displayed game outcome by discontinuing display of (i) the at least three of a same symbol displayed in the active symbol area and (ii) the one identifying characteristic in at least a portion of the inactive symbol display area; (2) display a modified game outcome wherein (i) the at least three of the same symbol are replaced by at least three other symbols and (ii) the active symbol display area includes the at least a portion of the inactive symbol display area in which the display of the at least one identifying characteristic is discontinued; and (3) responsive to an occurrence of the triggering event in the modified game outcome, repeat (1) and (2); whereby additional portions of the inactive symbol display area are included in the active symbol display area of the modified game outcome; and (f) responsive to at least one of (i) the absence of an occurrence of the triggering event and (ii) the discontinuing of the display of the at least one identifying characteristic in at least a preset amount of the inactive symbol display area of the modified game outcome, determine an enhanced award outcome associated with the symbols in the active symbol display area of the modified game outcome, the credit balance being increasable by the enhanced award outcome amount.

In some embodiments of the aforementioned gaming system the at least one identifying characteristic comprises obscuring at least a portion of the symbols in the inactive symbol display area.

In some embodiments of the aforementioned gaming system the award outcome is determined responsive to at least one of (i) the absence of an occurrence of the triggering event and (ii) the discontinuing of the display of the at least one identifying characteristic in the entirety of the inactive symbol display area.

In some embodiments of the aforementioned gaming system the symbols are replaced by symbols in the active or inactive symbol display areas, which may be adjacent thereto, or randomly generated.

Some embodiments of the invention are directed to a gaming system, comprising: a housing; at least one display device supported by the housing; one or more input devices; at least one processor; and at least one memory device that stores a plurality of instructions that, when executed by the at least one processor, cause the at least one processor to communicate with the at least one display device and one or more input devices to: (a) establish a credit balance based at least in part on a monetary value; (b) receive a wager to initiate play of a wagering game in response to receipt of an actuation of a wager from the one or more input devices, the credit balance being decreasable by the wager; (c) randomly display an outcome of an instance of play of the wagering game, wherein the displayed game outcome includes (i) a depiction of adjacent virtual reel strips forming an array of rows and columns defining a plurality of cells, each cell of the plurality of cells having at least one symbol of a plurality of symbols displayed therein, (ii) an active symbol display area including a plurality of cells in the array, the active symbol display area being determinative of an award outcome and (iii) an inactive symbol display area including a plurality of cells in the array, wherein the inactive symbol display area is visibly distinguishable from the active symbol display area in the displayed game outcome by at least one identifying characteristic, the at least one identifying characteristic obscuring at least a portion of the plurality of symbols in the inactive symbol display area; (d) determine an award outcome based on the plurality of symbols in the active symbol display area of the displayed game outcome, the credit balance being increasable by the determined award outcome; (e) responsive to an occurrence of a triggering event in the displayed game outcome, wherein the triggering event comprises at least a preset amount of one or more predefined symbols displayed in a preset configuration in the active symbol display area: (1) modify the displayed game outcome by (i) discontinuing the display of the predefined symbols resulting in the occurrence of a triggering event, (ii) displaying symbols as moving from a starting position in the displayed game outcome into a cell from which the display of the predefined symbols is discontinued, the starting position being an adjacent position in the virtual reel strip with respect to a predefined symbol, and (iii) discontinuing the display of the at least one identifying characteristic from a portion of the inactive symbol display area; (2) display a modified game outcome wherein the active symbol display area includes the portion of the inactive symbol display area in which the display of the at least one identifying characteristic is discontinued; (3) determine an enhanced award outcome associated with the symbols in the active symbol display area of the modified game outcome; and (4) responsive to an occurrence of the triggering event in the modified game outcome, repeat (1), (2) and (3), whereby additional portions of the inactive symbol display area are included in the active symbol display area of the modified game outcome; and (f) responsive to one of (i) the absence of an occurrence of the triggering event and (ii) the display of the at least one identifying characteristic being discontinued for all of the plurality of cells in the inactive symbol display area of the modified game outcome, increase the credit balance by the total of the determined enhanced award outcome.

In some embodiments of the aforementioned gaming system each of the active symbol display area and inactive symbol display area include a plurality of rows in the array.

In some embodiments of the aforementioned gaming system the preset amount of one or more predefined symbols displayed in a preset configuration in the active symbol display area comprises at least three of any of a same symbol of the plurality of symbols in one of at least three adjacent horizontal cells in the active symbol display area and at least three adjacent vertical cells in the active symbol display area.

Some embodiments of the invention are directed to a method of providing an award enhancing feature in a wagering game, the wagering game being operable on a computing device including a display device, memory and a processor; wherein the memory stores a plurality of instructions that, when executed by the at least one processor, cause the at least one processor to operative communicate with the at least one display device to enable the method comprising the steps of: (a) establishing a credit balance associated with a player account; (b) receiving a wager to initiate play of a wagering game, the credit balance being decreasable by the wager; (c) randomly displaying an outcome of an instance of play of the wagering game, wherein the displayed game outcome includes one or more symbols of a plurality of symbols in an active symbol display area, the one or more symbols in the active symbol display area being determinative of an award outcome, and one or more symbols of the plurality of symbols in an inactive symbol display area, the one or more symbols in the inactive symbol display area being unused in the determination of the award outcome, the inactive symbol display area being distinguishable from the active symbol display area in the displayed game outcome by at least one identifying characteristic; (d) determining an award outcome based on the plurality of symbols in the active symbol display area, the credit balance being increasable by any determined award outcome; (e) responsive to the detection of an occurrence of a triggering event in the displayed game outcome, wherein the triggering event comprises at least a preset amount of one or more predefined symbols being displayed in a preset configuration in the active symbol display area: (1) modifying the displayed game outcome by discontinuing display of the at least one identifying characteristic in at least a portion of the inactive symbol display area; (2) determining an enhanced award outcome associated with the one or more symbols in the active symbol display area of the modified game outcome, the active symbol display area of the modified game outcome including the at least a portion of the inactive symbol display area in which the display of the at least one identifying characteristic is discontinued; and (3) responsive to the detection of an occurrence of a triggering event in the modified game outcome, repeating (1) and (2), whereby the display of the at least one identifying characteristic is discontinued in one or more additional portions of the inactive symbol display area; (f) responsive to at least one of (i) the absence of the detection of an occurrence of a triggering event in the modified game outcome and (ii) the discontinuing of the display of the at least one identifying characteristic in all portions of the inactive symbol display area of the modified game outcome, increasing the credit balance being by the determined enhanced award outcome; and (g) initiating a payout of the credit balance in response to receipt of a payout request.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF THE INVENTION

Figure 1:
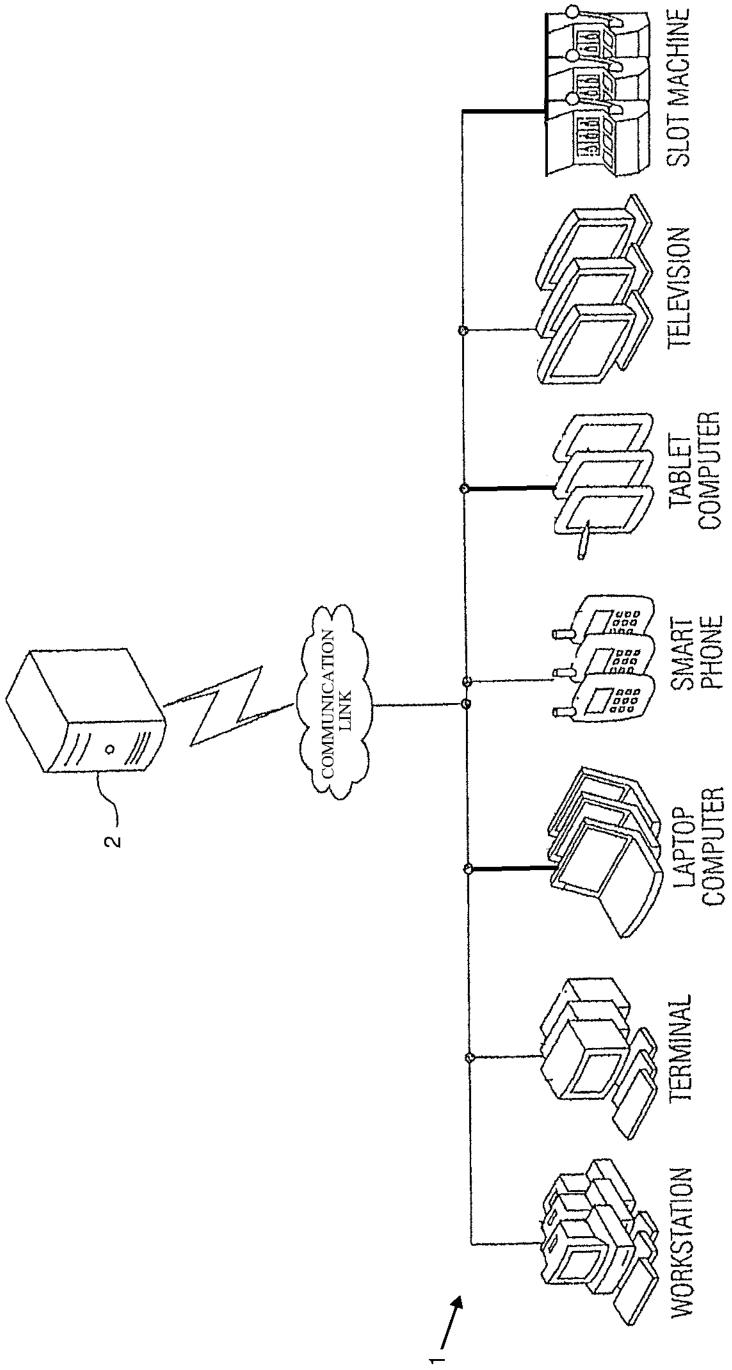
FIG. 1 is a schematic representation of various examples of gaming systems which may be used with embodiments of the invention.

The following detailed description provides systems and methods for implementing features in gaming applications. The gaming applications may be implemented in accordance or in conjunction with one or more of a variety of different types of gaming systems, such as those described herein, including computer based platforms which may be specially configured for the provision of wagering games, such as electronic gaming machines, or other devices which are not specially configured for the provision of wagering games, such as a smartphone, that can be enabled as a platform through which such wagering game features of the invention can be made accessible. Embodiments of the invention therefore contemplate a variety of different gaming systems each having one or more of a plurality of different features, attributes, or characteristics as disclosed herein.

It should nonetheless be understood that electronic gaming machines are implemented with special features and/or additional circuitry that differentiates them from general-purpose computers (e.g., desktop PC's and laptops). Gaming machines are highly regulated to ensure fairness and, in many cases, gaming machines are operable to dispense substantial monetary awards. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

Though both personal computers, or personal computing devices as the term is used herein, and gaming machines employ microprocessors that control a variety of devices, adapting technology used in personal computers to a gaming machine can be quite difficult because of reasons such as the regulatory requirements that are placed upon gaming machines, the harsh environment in which gaming machines operate, security requirements and fault tolerance requirements. Further, techniques and methods for solving a problem in the computer industry, such as device compatibility and connectivity issues, might not be adequate in the gaming environment. For instance, a fault or a weakness tolerated in a personal computer, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between personal computer systems and gaming systems will be described. A first difference between gaming machines and common personal computer based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. The requirement for a state-based system affects the software and hardware design on a gaming machine.

A second important difference between gaming machines and common personal computer based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common personal computer based computer systems is the number and kinds of peripheral devices used on a gaming machine are not as great as on personal computer based computer systems. Traditionally, in the gaming industry, gaming machines have been relatively simple in the sense that the number of peripheral devices and the number of functions the gaming machine has been limited. Further, in operation, the functionality of gaming machines are relatively constant once the gaming machine was deployed, and new peripherals devices and new gaming software are infrequently added to the gaming machine. This differs from a personal computer where users often buy different combinations of devices and software from different manufacturers and connect them to a computer to suit their needs. Therefore, the types of devices connected to a personal computer may vary greatly from user to user depending in their individual requirements and may vary significantly over time.

Although the variety of devices available for a personal computer may be greater than on a gaming machine, gaming machines still have unique device requirements that differ from a personal computer, such as device security requirements not usually addressed by personal computers. For instance, monetary devices, such as coin dispensers, bill validators and ticket printers and computing devices that are used to govern player accounts, credit and debit player account balances and handle the input and output of cash to a gaming machine have security requirements that are not typically addressed in personal computers. Therefore, many personal computer techniques and methods developed to facilitate device connectivity and device compatibility do not address the emphasis placed on security in the gaming industry.

The foregoing notwithstanding, features of the invention may be implemented on gaming machines and other devices which are not specially configured for the provision of a wagering game and make lack certain components typically included in a gaming machine. Accordingly, a gaming system as used herein refers to various configuration that may include one or more central servers, central controllers, or remote hosts, one or more electronic gaming machines and/or one or more devices which are not specially configured for the provision of a wagering game, such as desktop computers, laptop computers, tablet computers or computing devices, televisions, personal digital assistants (PDAs), mobile telephones such as smart phones, and other mobile computing devices hereinafter referred to collectively as personal computing devices.

Thus, in various embodiments, the gaming system of the present disclosure includes: one or more electronic gaming machines in combination with one or more central servers, central controllers, or remote hosts; one or more personal computing devices in combination with one or more central servers, central controllers, or remote hosts; one or more personal computing devices in combination with one or more electronic gaming machines; one or more personal computing devices, one or more electronic gaming machines, and one or more central servers, central controllers, or remote hosts in combination with one another; a single electronic gaming machine; a plurality of electronic gaming machines in combination with one another; a single personal computing device; a plurality of personal computing devices in combination with one another; a single central server, central controller, or remote host; and/or a plurality of central servers, central controllers, or remote hosts in combination with one another.

In the various embodiments, the personal computing devices and/or electronic gaming machines are configured to communicate with the central server, central controller or remote host through a communication link, such as a local or wide area data network, closed, intranet or open system or remote link such as the Internet.

FIG. 1 illustrates a schematic of exemplary gaming system hardware and network platform that can be used to implement embodiments of the invention. The system includes slot machines (that is, electronic gaming machines and plurality of personal computing devices, which are interconnected and in communication with one or more central servers 2 through one or more communication links, which may include a data networks and the internet. Exemplary personal computing devices shown in FIG. 1 include workstations, terminals (including self-service wagering terminals), laptops or other internet connected computing systems, mobile or smart phones, tablet computers and televisions. For brevity and clarity, each electronic gaming machine (slot machines, gaming machines, etc.) and personal computing device mentioned herein and any equivalents thereto is collectively referred to herein as an "EGM." Thus, the electronic gaming machines and personal computing devices shown in FIG. 1 are generally designated by the reference numeral 1. Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: an EGM configured to communicate with a central server, central controller, or remote host through a data network; and/or a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: an EGM configured to communicate with a central server, central controller, or remote host through a data network; and/or a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: in an area of a gaming establishment different from an area of the gaming establishment in which the central server, central controller, or remote host is located; or in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: an EGM configured to communicate with a central server, central controller, or remote host through a data network; and/or a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the communication link, data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs).

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM. In other embodiments, at least one of the at least one processor of the EGM and the at least one memory device of the EGM reside outside the cabinet of the EGM In certain embodiments, as generally described herein, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. One input device of the EGM may be a payment device configured to communicate with the at least one processor of the EGM to fund the EGM or a player account which is capable of funding the EGM. In certain embodiments, the payment device includes one or more of: a bill acceptor into which paper money is inserted to fund the EGM; a ticket acceptor into which a ticket or a voucher is inserted to fund the EGM; a coin slot into which coins or tokens are inserted to fund the EGM; a reader or a validator for credit cards, debit cards, or credit slips into which a credit card, debit card, or credit slip is inserted to fund the EGM; a player identification card reader into which a player identification card is inserted to fund the EGM; through communication with a bank account or mobile device, such as a smartphone, or other account configured for transferring funds or cryptocurrency to the EGM upon authorization by a player; or any suitable combination thereof.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display.

Figure 2:
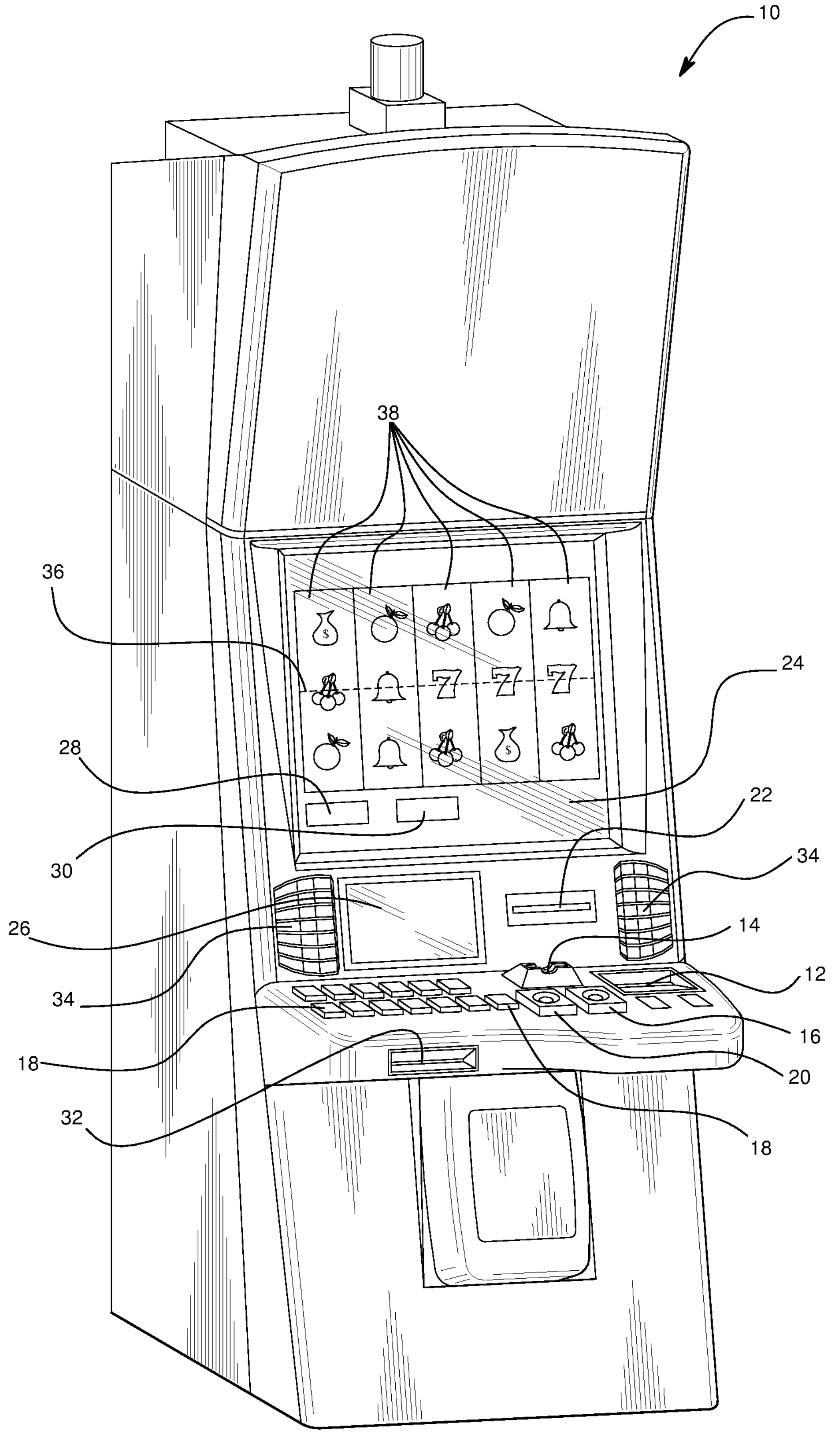
FIG. 2 is a perspective view of an exemplary embodiment of an electronic gaming machine which may be used with some embodiments of the invention.

FIG. 2 illustrates an exemplary EGM of the general type and form which may be fabricated and commercialized by any of the various gaming manufacturers generally indicated by the reference numeral 10. EGM 10 includes payment devices including a combined bill and ticket acceptor 12, and a coin slot 14.

In various embodiments, one or more input devices of the EGM are one or more game play activation devices that are each used to initiate a play of a game on the EGM or a sequence of events associated with the EGM following appropriate funding of the EGM. EGM 10 includes a game play activation device in the form of a game play initiation button 16. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display decreases by one, and a number of credits shown in a bet display increases by one. EGM 10 includes one or more input devices 18 consisting of various depressible buttons or touch sensors.

In other embodiments, one input device of the EGM is also a cash out device. The cash out device is utilized to receive a cash payment or any other suitable form of payment corresponding to a quantity of remaining credits of a credit display. EGM 10 includes a cash out device in the form of a cash out button 20.

In certain embodiments, one input device of the EGM is a touch-screen coupled to a touch-screen controller or other touch-sensitive display overlay to enable interaction with any images displayed on a display device. One such input device is a conventional touch-screen button panel. The touch-screen and the touch-screen controller are connected to a video controller. In these embodiments, signals are input to the EGM by touching the touch screen at the appropriate locations.

In embodiments including a player tracking system, one input device of the EGM is a card reader in communication with the at least one processor of the EGM. EGM 10 includes a card reader 22. The card reader is configured to read a player identification card inserted into the card reader.

In various embodiments, the EGM includes one or more output devices. One or more output devices of the EGM are one or more display devices configured to display any game(s) displayed by the EGM and any suitable information associated with such game(s). In certain embodiments, the display devices are connected to or mounted on a cabinet of the EGM. In various embodiments, the display devices serves as digital glass configured to advertise certain games or other aspects of the gaming establishment in which the EGM is located. In various embodiments, the EGM includes one or more of the following display devices: a central display device; a player tracking display configured to display various information regarding a player's player tracking status; a secondary or upper display device in addition to the central display device and the player tracking display; a credit display configured to display a current quantity of credits, amount of cash, account balance, or the equivalent; and a bet display configured to display an amount wagered for one or more plays of one or more games. EGM 10 includes a central display device 24, a player tracking display 26, a credit display 28, and a bet display 30.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: a ticket generator configured to generate and provide a ticket or credit slip representing a payout, wherein the ticket or credit slip may be redeemed via a cashier, a kiosk, or other suitable redemption system; a note generator configured to provide paper currency; a coin generator configured to provide coins or tokens in a coin payout tray; and any suitable combination thereof. EGM 10 for example includes ticket generator 32. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. EGM 10 includes a plurality of speakers 34. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as EGM 10, EGMs have a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

It should be appreciated given the definition assigned to EGMs hereunder that certain of the example EGMs described above include certain elements that may not be included in all EGMs. For example, the payment device of a personal gaming device such as a smartphone may not include a coin slot.

In various embodiments, an EGM may be implemented in one of a variety of different configurations. In various embodiments, the EGM may be implemented as one of: a dedicated EGM wherein computerized game programs executable by the EGM for controlling any primary or base games and/or any secondary or bonus games or other functions displayed by the EGM are provided with the EGM prior to delivery to a gaming establishment or prior to being provided to a player; and a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: embedding the executable game program in a device or a component (such as a microchip to be inserted into the changeable EGM); writing the executable game program onto a disc or other media; or uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM.

That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: a player database for storing player profiles, a player tracking module for tracking players, and a credit system for providing automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system, each substantially equally spaced apart from one another in areas or "cells" along the respective reel strip or virtual representation thereof. In certain such embodiments, the gaming system includes one or more paylines associated with the reels. EGM 10 includes a payline 36 and a plurality of reels 38. In certain embodiments, one or more of the reels are independent reels or unisymbol reels. In such embodiments, each independent reel generates and displays one symbol per cell in the display.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides, activates or initiates game features in the primary game or the secondary game upon the occurrence of a triggering event or the satisfaction of a preset criteria or qualifying condition. In other embodiments, the gaming system initiates the secondary game upon the occurrence of the triggering event or the satisfaction of the qualifying condition and upon receipt of an initiation input. In certain embodiments, the triggering event, preset criteria or qualifying condition is a selected outcome in the primary game(s) or a particular arrangement of one or more indicia on a display device for a play of the primary game(s), such as one or more symbols appearing on three adjacent reels along a payline following a spin of the reels for a instance of play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more game features or secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

As discussed, the present disclosure contemplates a variety of different gaming systems each having one or more of a plurality of different features, attributes, or characteristics. Exemplary embodiments herein below describe primary and/or secondary game features according to the invention. Each of such features may be combined with another, applied and utilized after each spin or game, may occur only upon or the spin immediately after a triggering event, such as players receiving a trigger symbol or upon the occurrence of another bonus or event in the underlying game, or may be available for every game in which a player wagers the maximum amount allowable in the game, that is, "maxbet," or a bonus feature may be triggered during the operation of another game or bonus feature. Any of the game or bonus features may involve or require player interaction or input, or occur automatically, either immediately along with an associated display or after a period of time has elapsed in which no player input is received, or combinations thereof. The operation of game or bonus features herein may be impacted by and a function of systems and methods configured to achieve a desired return to player ("RTP").

Figure 3:
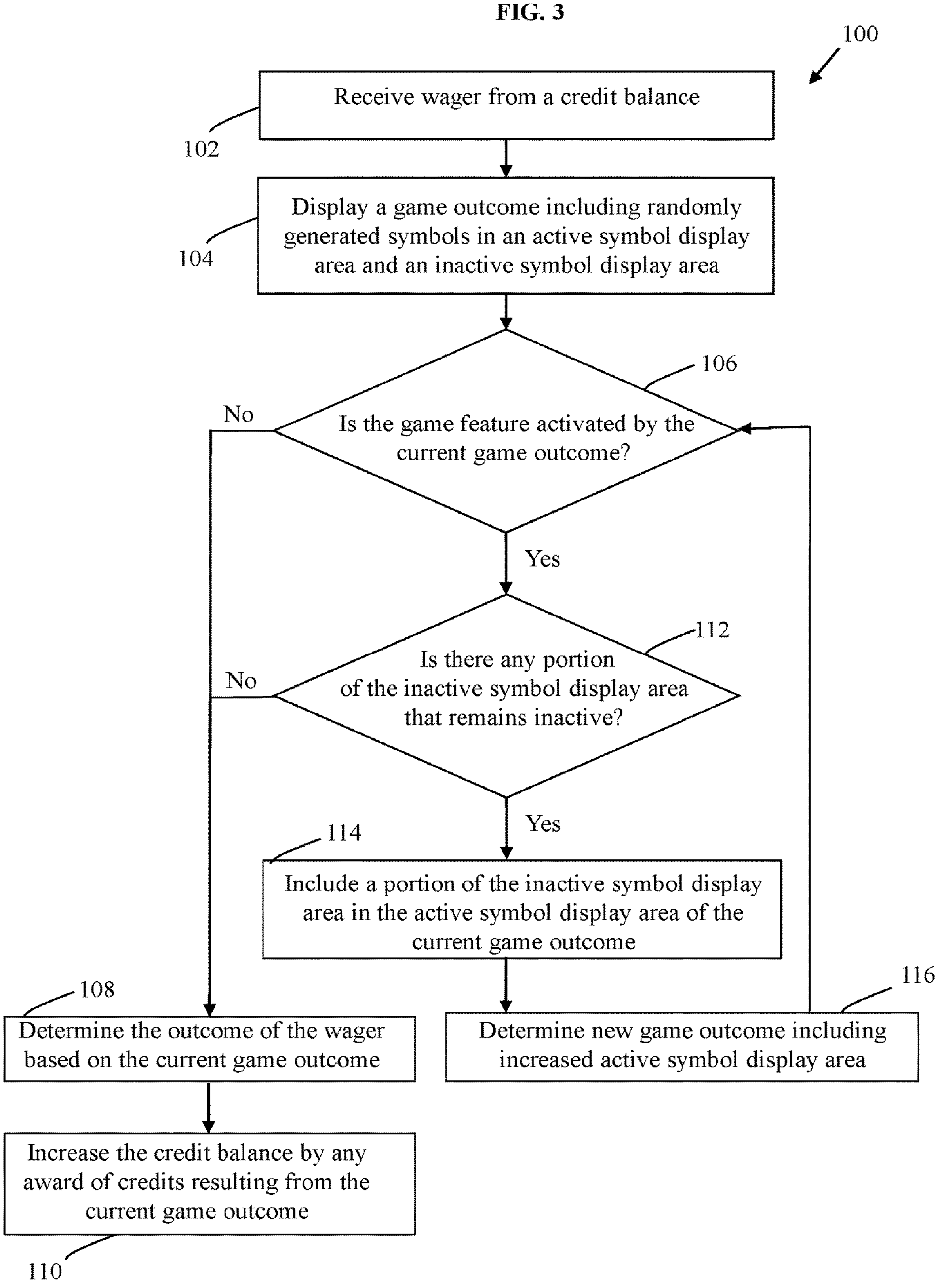
FIG. 3 is a flowchart illustrating a method of operating an exemplary embodiment of the gaming system of the invention.

FIG. 3 illustrates a flowchart of an exemplary embodiment of a process or method 100 of operating the gaming system of the invention, which may be represented by a set of instructions stored in one or more memories and executed by one or more processors which may be in communication with one or more random number generators.

In this embodiment a gaming system of the invention is configured to operate a game associated with a plurality of different symbols used to determine the outcome of the game. Assuming a credit balance has been established for use with the gaming system, such as by an input or payment device receiving funds or an item of monetary value, such as a ticket, a wager for play of the slot game in an initial state is received in block 102. Response to receiving the wager, the credit balance is decreased by the amount of the wager being debited from the credit balance. The wager may be placed pursuant to actuation of a wager input signal by the player through a button or virtual representation thereof.

In an initial state, the gaming system provides a game outcome which includes displays symbols randomly selected from the plurality of different symbols in an active symbol display area and an inactive symbol display area responsive to receipt of a wager, as shown by block 104. As shown by block 106, should a game feature not be activated, then the outcome of the game (and wager received) is determined by the symbols displayed in the active symbol display area of the game outcome in the current state, as shown in block 108. For example, any paylines would include symbols displayed in the active symbol display area only, even if the paylines crossed into the inactive symbol display area. Any award associated with the current game outcome is credited to the credit balance thus increasing the credit balance available as shown in block 110.

As shown by blocks 106, 112 and 114, responsive to activation of a game feature, if any of the inactive symbol display area remains inactive, then a portion of the inactive symbol display area becomes active and included in the active symbol display area for purposes of determining a new game outcome in the current state as shown in block 116. For example, in the current state after activation of the game feature, paylines would now include symbols displayed in the active symbol display area and the now-active first portion. The game feature may be activated by the occurrence of a triggering event, as detected or determined by a processor or controller. The triggering event may occur based on symbols or combinations thereof displayed in the active symbol display area of the current game outcome. The triggering event for the game feature may also be the result of a secondary random number generator. If all of the inactive symbol display is active, then as shown by block 112 and block 108, the wager is determined by the current game outcome.

As shown by block 116, a new game outcome is determined based on the increased active symbol display area resulting from activation of the game feature. The increase in the active symbol display area may also result in further activation of the game feature as shown by the arrow from block 116 to block 106. Thus, the game feature methodology shown in FIG. 3 may continue until all of the inactive symbol display area is made active and included with the active symbol display area for purposes of determining the game and/or award outcome.

Figure 4:
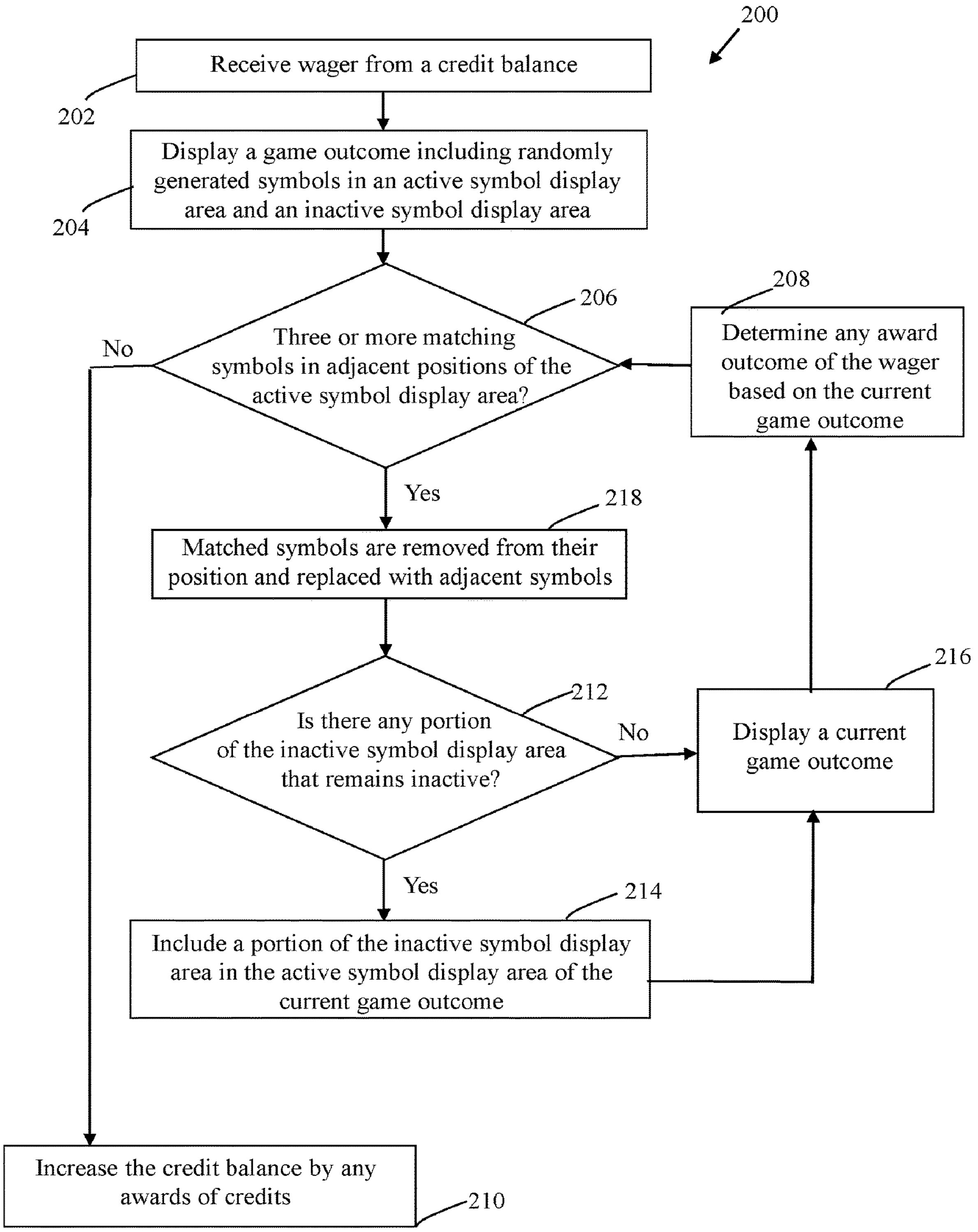
FIG. 4 is a flowchart illustrating a method of operating another exemplary embodiment of the gaming system of the invention.

As shown by FIG. 4, a process or method 200 of operating an EGM of the invention to provide a slot game having multiple reels defining a plurality of positions on a display. In this embodiment, upon the occurrence of the triggering event of three or more matching symbols being displayed in adjacent positions of the active symbol display area, the matching symbols are no longer displayed and symbols along the same reel from either or both the inactive and active areas are moved into the unoccupied positions of the reel as shown by block 218. The game feature is activated, such that a portion of the inactive symbol display area is included in the active symbol display area, if any of the inactive symbols display area remains inactive, as shown by blocks 212 and 214. In some embodiments, the matching symbols must be in all horizontal or all vertical adjacent positions to constitute an occurrence of the triggering event. In other embodiments the matching symbols may be in any combination of diagonal, horizontal and/or vertical positions so long as they are adjacent positions relative to one another. In some embodiments the matching symbols may be removed and replaced with adjacently positioned symbols. For example, in some embodiments the triggering event involves a reel-type slot game incorporating a match 3 game, wherein the matching activates the game feature. As shown by blocks 216 and 208, the current game outcome, which may include the increased active symbol display area pursuant to block 214, is displayed and any award outcome of the wager based on the current game outcome including the increased active symbol area is determined prior to determining in block 206 if the game feature is triggered again by the current game outcome.

As shown by blocks 212, 216, and 208, if no portions remain inactive, that is, the inactive symbol display area has been fully activated, then current game outcome resulting from the movement of symbols per block 218 is displayed and any awards based on the current game outcome are determined as shown in block 208 prior to determining in block 206 whether the game feature is triggered in step 206. Thus, the increase of the active symbol display area as well may result in the occurrence of additional triggering events of three or more matching symbols being displayed in adjacent positions of the active symbol display area, as well as the removal of the matching symbols from their respective positions in the reel or reels, and the movement of adjacent symbols into the unoccupied positions. Responsive to the failure to detect the occurrence of additional triggering events, that is, when three or more matching symbols are not displayed in adjacent positions of the active symbol display area of the current game outcome, even after the matched symbols are replaced, then as shown by blocks 206 and 210, any awards, including any enhancements of the awards by the increased active area, are credited to increase the credit balance as shown by block 210.

Although process 100 and 200 are described with reference to the flowchart shown in FIG. 3 and FIG. 4, it should be appreciated that many other processes of performing the acts associated with this illustrated process may be employed. For example, the order of certain of the illustrated blocks and/or diamonds may be changed, certain of the illustrated blocks may be optional, and/or certain of the illustrated blocks may not be employed.

Figure 5:
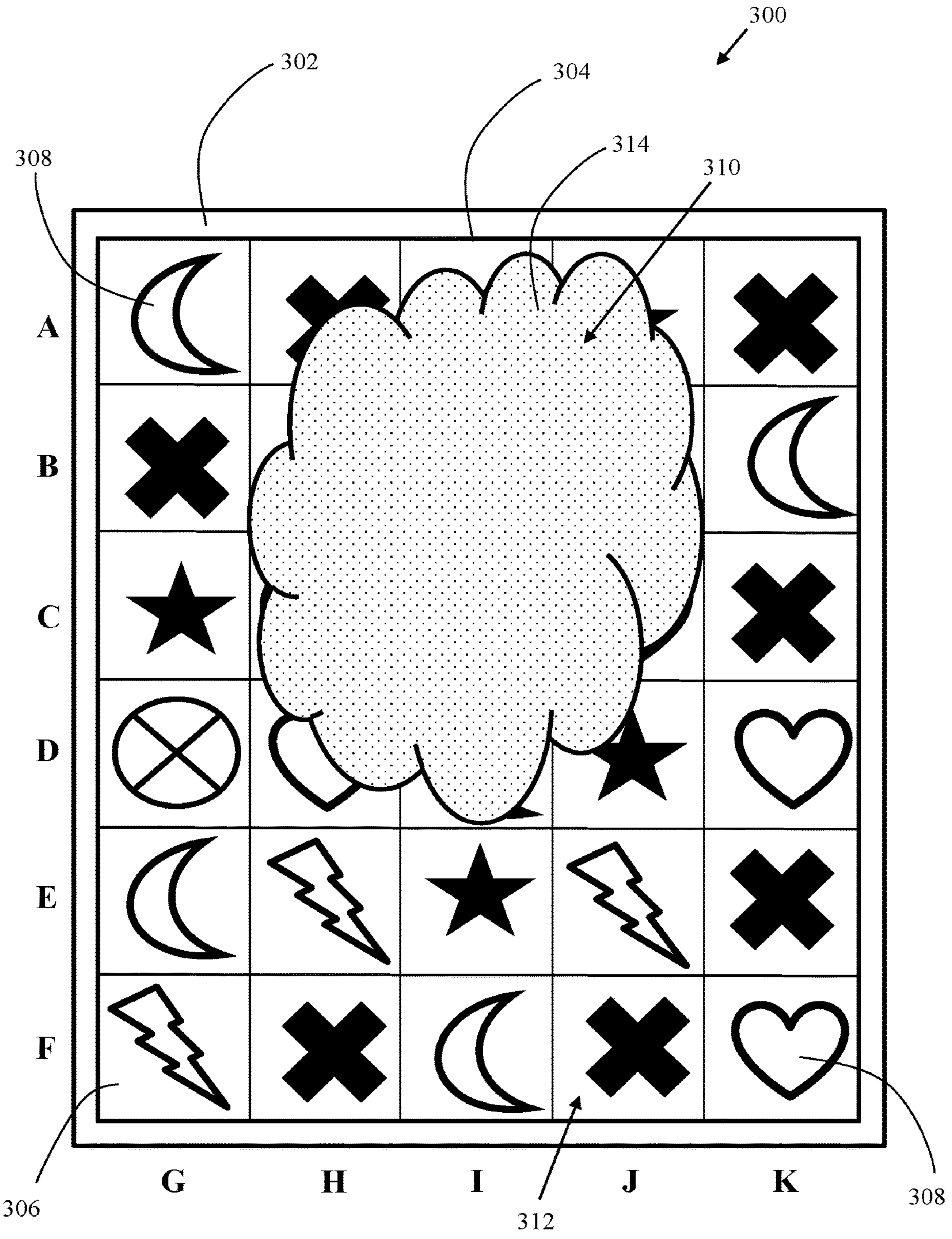
FIGS. 5-6 illustrate display screens of a gaming system of the invention illustrating exemplary embodiment of an inventive game feature.

FIG. 5 is illustrates a game user interface 300 configured according to some embodiments of the invention for display as a screen on a display device operatively associated with an EGM. It should be understood that game user interface 300 may be configured for use on any gaming system or EGM including any shown in FIG. 1 and FIG. 2.

In this embodiment, the game display 302 displayed to players comprises an area having the appearance of multiple reels forming a grid 304 composed of rows and columns defining cells 306. Game display 302 may further include game information in areas adjacent to grid 304 which may include credits remaining, credits won or bet and game graphics, among other things. Each cell 306 has one or more symbols 308 therein which may have a value in the game associated therewith. As a result of an instance of play of game 302, grid 304 is randomly populated with symbols 308 via a processor accessing a random number generator. To play game 302 a player may be required to submit credits or money through any conventional means, such as an e-wallet or other payment transfer system if playing through an online platform, or a card or money reader, such as acceptor 12, if playing through an electronic gaming machine platform. Determining an outcome for an instance of play of game 302 generally depends on the randomly generated symbols 308 displayed as the game result, such as by their respective position in grid 304 and/or in connection with one or more paylines.

In one or an initial state of play of game 302, at least one of the cells 306, rows and columns in grid 304, or portions thereof, will be excluded from use in determining the game result achieved through play of an instance of game 302. The portion of grid 304 excluded from the game result defines an excluded or inactive symbol display area 310 and an included or active symbol display area 312, with the symbols 308 randomly generated for display in the active symbol display area 312 being used to determine the game result. Inactive symbol display area 310 of grid 304 may or may not be displayed as part of interface 300 during an instance of game 302. However, even if inactive symbol display area 310 is displayed, any symbols 308 randomly generated in inactive symbol display area 310 are still not used in determining the game result when game 302 is played. In other words, inactive symbol display area 310 may be displayed during play of game 302, but any credits won or lost during an instance of game 302 are calculated without consideration of any symbols 308 displayed in inactive symbol display area 310.

In some embodiments, inactive symbol display area 310 is displayed on interface 300 differently than grid area 312 or there is some visual indication of the inactive symbol display area displayed on interface 300. For example, inactive symbol display area 310 may be displayed as blurred or covered by a graphical element, such as a lock (which may be subsequently unlocked), a lattice or bar covering some or all of the inactive symbol display area 310. As shown in FIG. 5 a graphical element 314 resembling a cloud covers inactive symbol display area 310.

Figure 6:
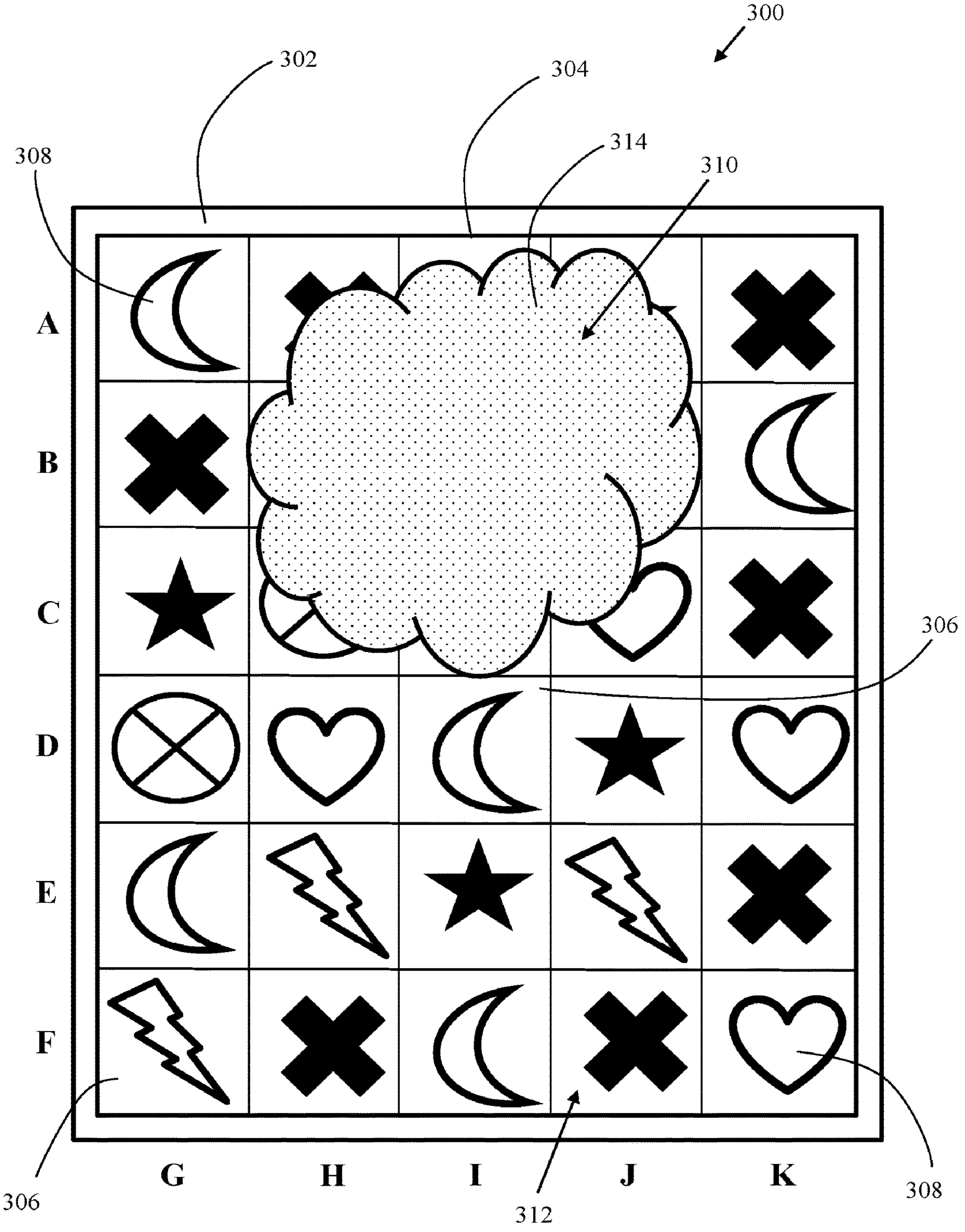

A first game feature according to the invention as described herein can be activated during play of game 302 which results in adding or revealing at least a portion of inactive symbol display area 310 to the current or subsequent instances of play of game 302. In some embodiments, the revealing of inactive symbol display area 310 may involve the blurring of symbols in inactive symbol display area 310 in the initial state becoming clear when the game feature is activated, or a graphical element obscuring or otherwise covering the inactive symbol display area 310 being no longer displayed. FIG. 6 shows graphical element 314 being reduced in size to reveal additional cells 306 which were previously covered in inactive symbol display area 310.

Figure 7:
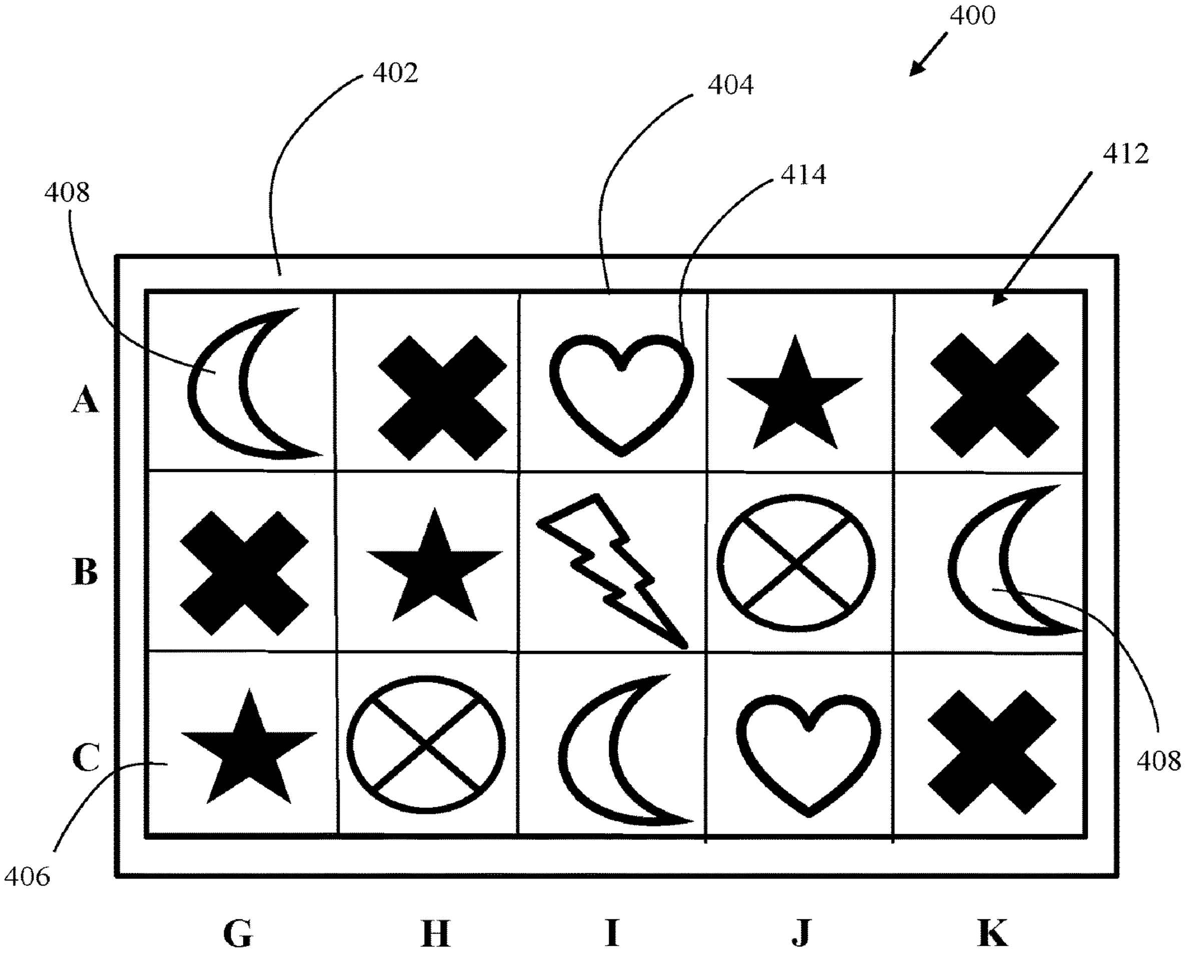
FIGS. 7-8 illustrate display screens of a gaming system of the invention illustrating another exemplary embodiment of an inventive game feature.
Figure 8:
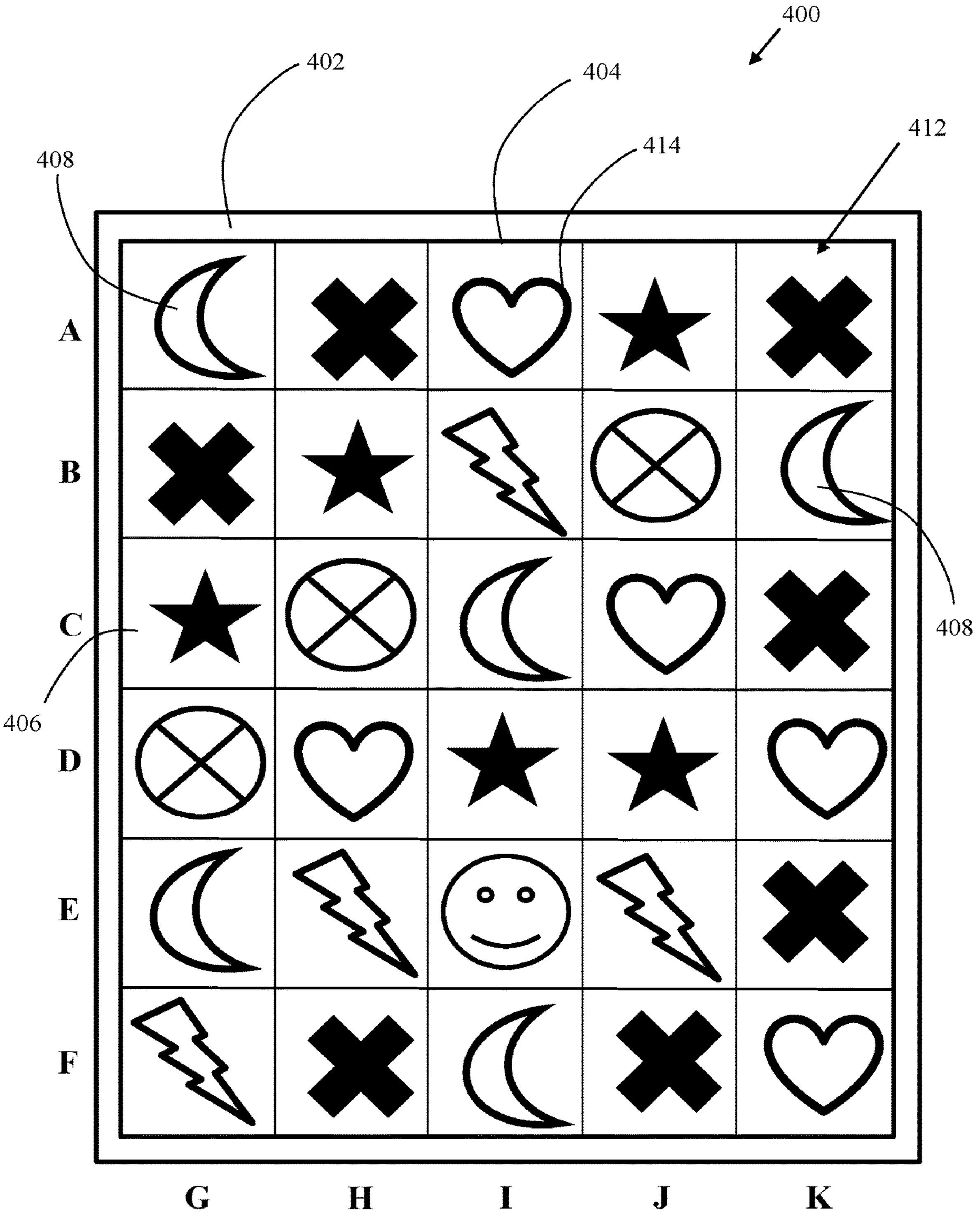

FIG. 7 illustrates another embodiment of a game interface 400 constructed in accordance with this invention in which only rows A, B and C are displayed forming a 3×5 grid 404 in an initial state shown in FIG. 7. Responsive to activation of the first game feature, rows D, E and F are added to the display forming a 6×5 grid 404 of game display 402 as shown in FIG. 8. Rows D, E and F were included with the reels but not displayed in the initial state of this embodiment because these rows were part of the inactive symbol display area 410.

In some embodiments, the portion of inactive symbol display area 310 revealed becomes part of grid area 312 and thus active in subsequent game results. In some embodiments, the portion of inactive symbol display area 310 revealed becomes immediately active in the game result, that is, any symbols 308 in the revealed portion of inactive symbol display area 310 included in grid area 312 may change the game result which actuated the first game feature. Thus, in such embodiments, the activation of the first game feature may result in additional winnings as the portion of the inactive symbol display area 310 now made active provides additional symbols 308 that are used to determine a new game result.

In some embodiments, the first game feature may be activated more than once during game play to progressively reveal additional portions of the inactive symbol display area 310. In each instance that the first game feature is activated, an additional portion of inactive symbol display area 310 is revealed by removing more of graphic elements 314 or in game 402 by adding additional rows, columns or portions thereof, and the additional symbols 308 or 408 respectively therein may be included in the determination of a new game result.

For example, in a first state of play, inactive symbol display area 310 is not included, and responsive to the first game feature being activated, a second state of play is activated in which a portion of inactive symbol display area 310 becomes included in grid area 312. Responsive to first game feature being activated again while game 302 is in the second state of play, a third state of play is activated in which an additional portion of inactive symbol display area 310 becomes included in grid area 312. Responsive to the first game feature being activated again while game 302 is in the third state of play, a fourth state of play is activated in which an additional and final portion of inactive symbol display area 310 becomes included in grid area 312, such that all of inactive symbol display area 310 is now revealed and included in determining the game results. Thereafter, responsive to the deactivation of the first game feature, game 302 returns to the first state of play and the entire inactive symbol display area 312 is reestablished and no longer included in game results until the first game feature is activated again.

The first game feature may be deactivated after being activated during a gaming session. In some embodiments, the first game feature may be deactivated responsive to an amount or instances of play of game 302, the condition or criteria satisfied that activated the first game feature no longer existing, a bonus feature beginning or ending, a jackpot being won, after the game 302 is played with the entire inactive symbol display area 310 becoming part of the active symbol display area 312 or another preset criteria being satisfied. In other embodiments, the first game feature may be deactivated over time or based on a game result. Upon being deactivated, the inactive symbol display area 310 may become progressively excluded in a similar or the same manner as it was progressively included. In some embodiments, upon being deactivated the inactive symbol display area 310 may be entirely excluded and game 302 returns to the initial or first state of game play. In some embodiments, a new inactive symbol display area 310 may be defined on grid 304 responsive to the first game feature being deactivated.

In some embodiments, the first game feature is activated by satisfaction of a preset criteria associated with a game result. For example, the winning of a jackpot, as part of a bonus, the randomly generated display of a plurality of the same symbols 308 in cells 306 adjacent to one another, or random generation of one or more certain symbols 308 in a game result may be used as preset criteria for activating the first game feature. In other embodiments, the first game feature may be activated randomly.

In some embodiments, symbols 308 include special symbols that, when randomly generated in sufficient amount or form in grid 304, activate the first game feature. Symbols 308 may include a plurality of one or more special symbols. In some embodiments, responsive to the game result including a preset amount of one or more special symbols randomly generated for display in grid area 312 of grid 304, the first game feature is activated. In some embodiments, symbols 308 include a plurality of one special symbol. In some embodiments, all or almost all of symbols 308 are special symbols for purposes of activating the first game feature. In some embodiments, the amount of special symbols may vary, and for example, may depend on the amount wagered, such as max bet, game features, player tracking information, game play activity or game results.

In some embodiments, the first game feature is activated responsive to the random generation of the same one or more special symbols in grid area 312 in the preset amount, whereas in other embodiments the first game feature is activated responsive to the random generation of any of the one or more special symbols in grid area 312 in the preset amount.

In some embodiments, the first game feature is activated responsive to the preset amount of the one or more special symbols being randomly generated for display in grid area 312 in a predefined pattern of cells 306, such as adjacent cells, whereas in other embodiments the first game feature is actuated responsive to the preset amount of the one or more special symbols being randomly generated for display in any cells 306, such as three or more special symbols being generated for display in any cells 306 of grid area 312.

Once the first game feature is activated, the game controller facilitates the removal of the one or more special symbols so that they are no longer displayed in their respective cells 306. In some embodiments, new symbols 308 will appear to take the place of the removed symbols which may include additional special symbols. A random number generator may be used to randomly generate the value of any new symbols 308 added to cells 306 where special symbols are no longer displayed. In other embodiments, the removal of special symbols from cells 306 within grid area 312 will result in a symbol 308 in a cell 306 adjacent thereto, including any symbols 308 made available by revealing inactive symbol display area 310, being moved into the now vacated cell 306 to take the place of the removed symbol. In some embodiments, the symbol 308 or symbols depicted in a cell or cells 306 directly above each of the removed symbols are displayed with animation as moving downward relative to the position of grid 304 in interface 300, thus providing the appearance of any symbols 308 cells 306 above the vacated cells 306 being unsupported as a result of the removal of the special symbol directly below and impacted by the force of gravity causing the symbol 308 to fall into the vacated cell 306.

In some embodiments, the movement of symbols 308 may activate the first game feature more than once, such that an additional portion of inactive symbol display area 310 is revealed. As described above, symbols 308 in the newly revealed portion, which may include special symbols, may then move into a position which satisfies the preset criteria for activating the first game feature again, thus revealing an additional portion of the inactive symbol display area 310 and making symbols 308 therein available in grid area 312 for use in determining the game result and for purposes of satisfying the preset criteria for activating the first game feature again. By this process, all of inactive symbol display area 310 may be progressively revealed until the first game feature is discontinued by, for example, the preset criteria for activating the first game feature failing to be satisfied in a subsequent instance of game 302.

Figure 9:
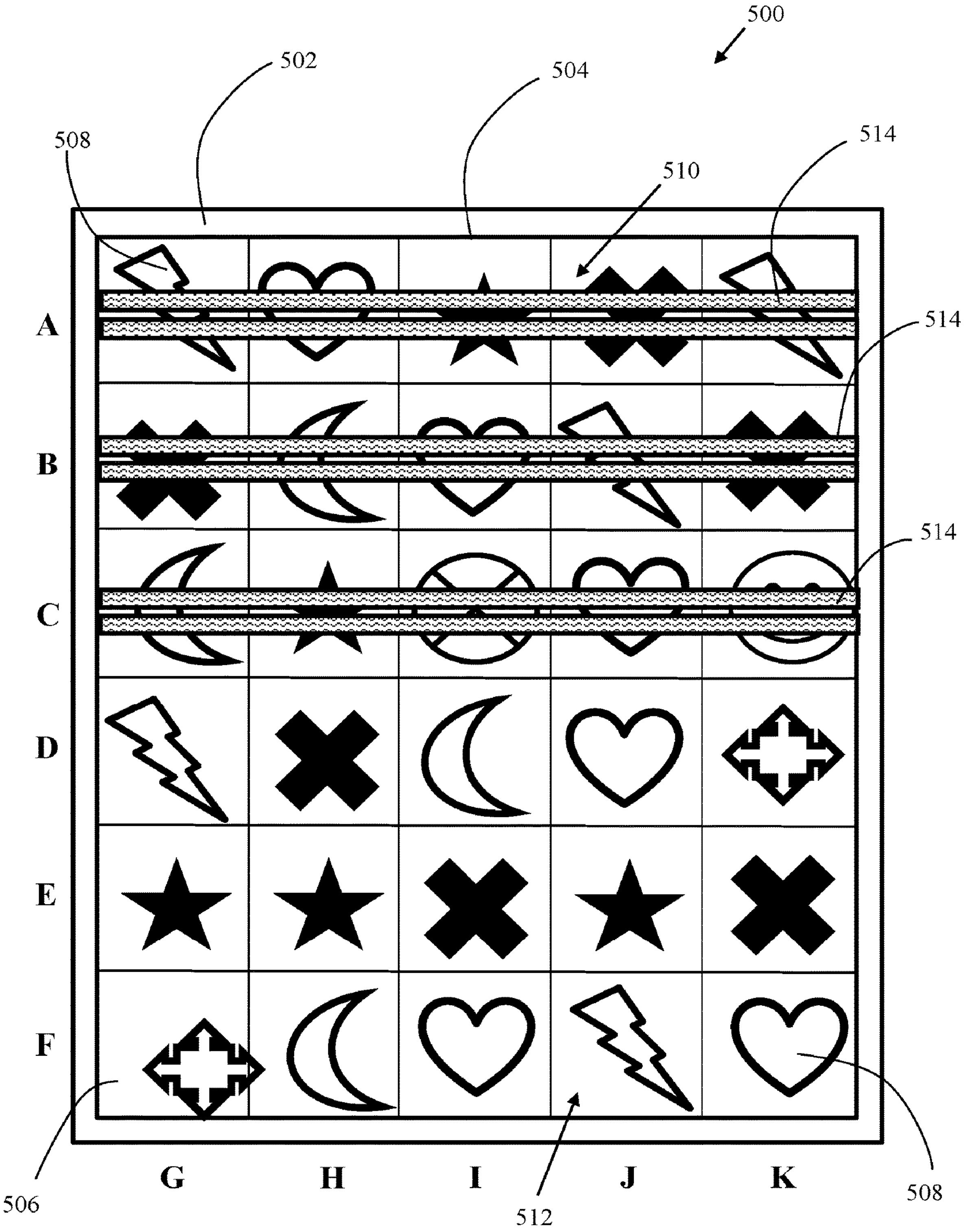
FIGS. 9-22 illustrate display screens of a gaming system of the invention illustrating yet another exemplary embodiment of an inventive game feature.

An exemplary embodiment of the invention is illustrated in FIG. 9, in which an interface 500 is illustrated having a grid 504 formed of six rows A through F and five reel strips or columns G through K. FIG. 9 depicts game 502 in an initial state prior to an instance of a game result. In the initial state of this embodiment of game 502, inactive symbol display area 510 includes the upper half of grid 504, that is, the 3×5 grid of fifteen cells 506 formed by rows A, B and C and all columns G through K. The lower half of grid 504, that is, the 3×5 grid of fifteen cells 506 formed by rows D, E and F and all five columns G through K, comprises the active symbol display area 512 for purposes of determining the game result in the initial state. Three graphical elements 514 are depicted as being in the foreground horizontally across rows A, B and C such that elements 514 prevent fully viewing symbols 508 in inactive symbol display area 510.

Figure 10:
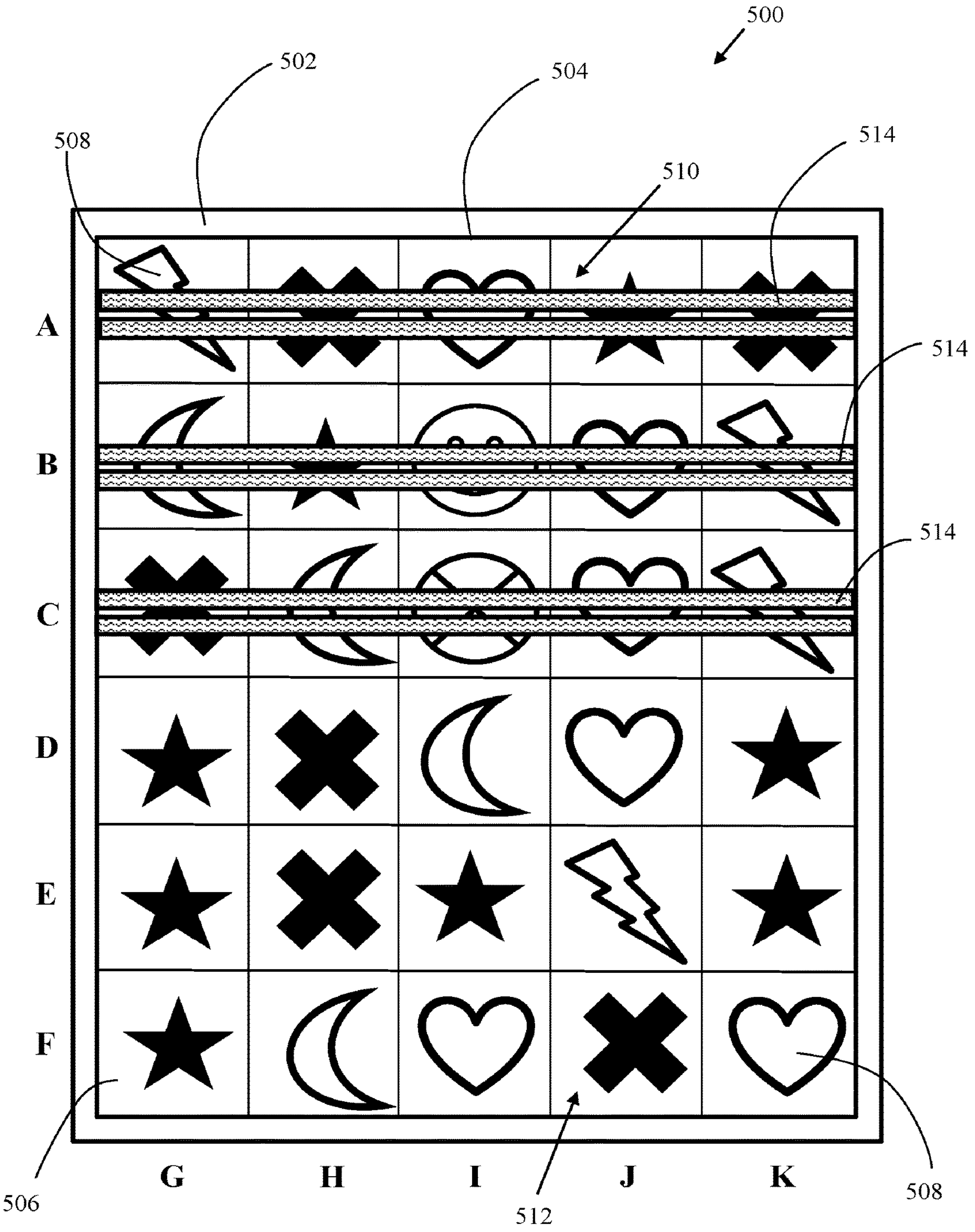

FIG. 10 illustrates game 502 after an instance of a game result with randomly generated symbols 508 displayed in both inactive symbol display area 510 and active symbol display area 512 of grid 504. In this embodiment, the appearance of three or more matching symbols 508 in adjacent cells 506 in a game result activates the first game feature.

Figure 11:
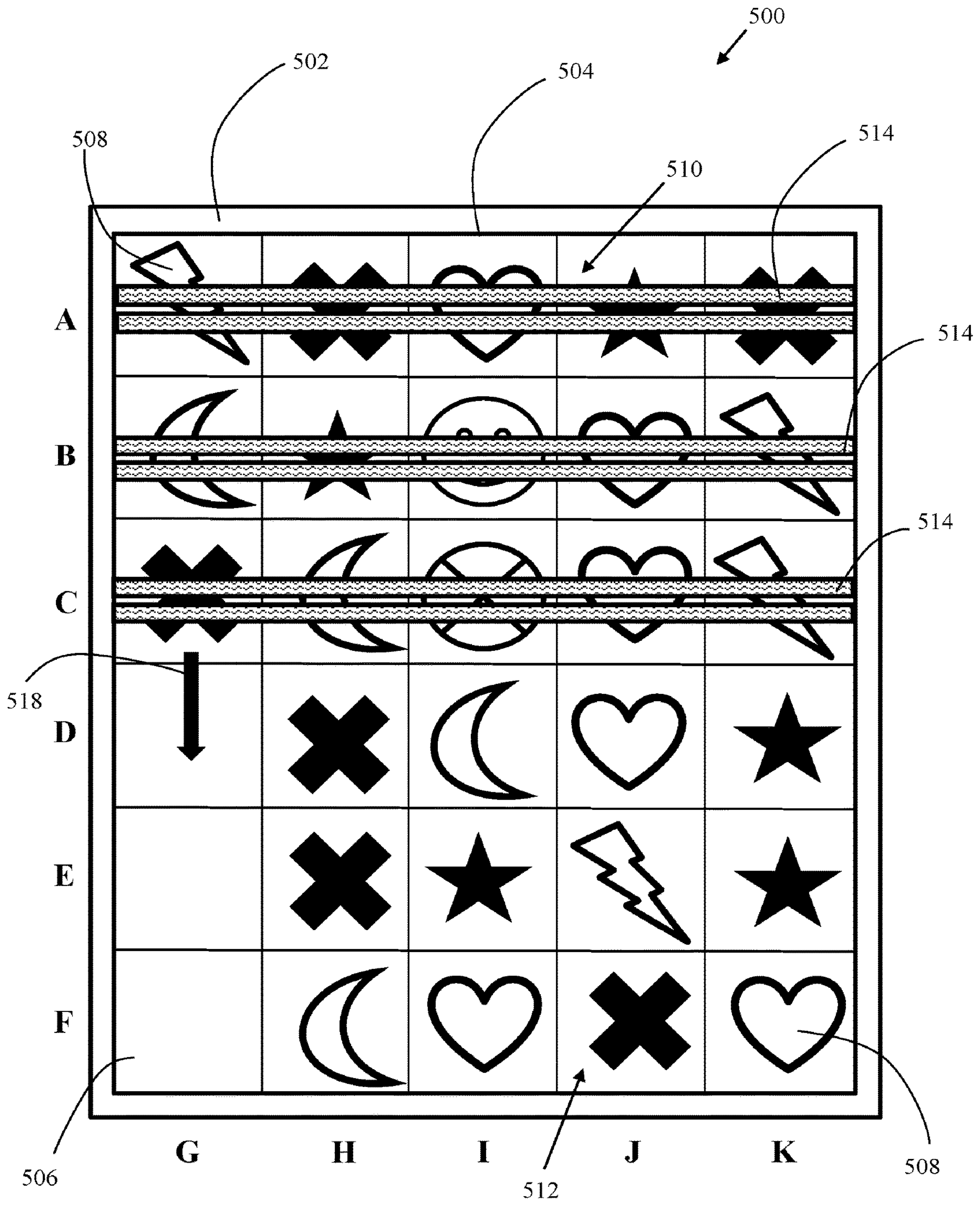

As shown in FIG. 10, the game result includes three "star" symbols 508 in the cells 506 defined by rows D, E and F and column G. These three symbols 508 are matching and are shown as being removed from the display of game 502. An animation of symbols 508 pulsing may be presented until these symbols 508 are no longer displayed at all on interface 500. Upon their removal, the first game feature is activated and symbols 508 directly above the vacated cells 506 move as shown by arrow 518 in FIG. 11. In this embodiment symbols will be made to appear to fall downward relative to the position of interface game 502 on interface 500. The symbols 508 fall into the vacated cells thus replacing the removed symbols 508. In other words, symbols 508 in rows A, B and C of column G will move from inactive symbol display area 510 into rows D, E and F of column G. At the same time, graphical element 514 covering row C is removed to reveal and include row C in active symbol display area 512 and forming a 4×5 grid for purposes of determining the game result. In some embodiments, symbols 508 which were on a reel strip forming column G but not shown in grid 504 are now shown in rows A and B in column G of inactive symbol display area 510.

In this embodiment, credits are also won upon the removal of three or more adjacent matching symbols 508. The amount of credits may vary depending on the amount and/or the particular symbols 508 matched.

Figure 12:
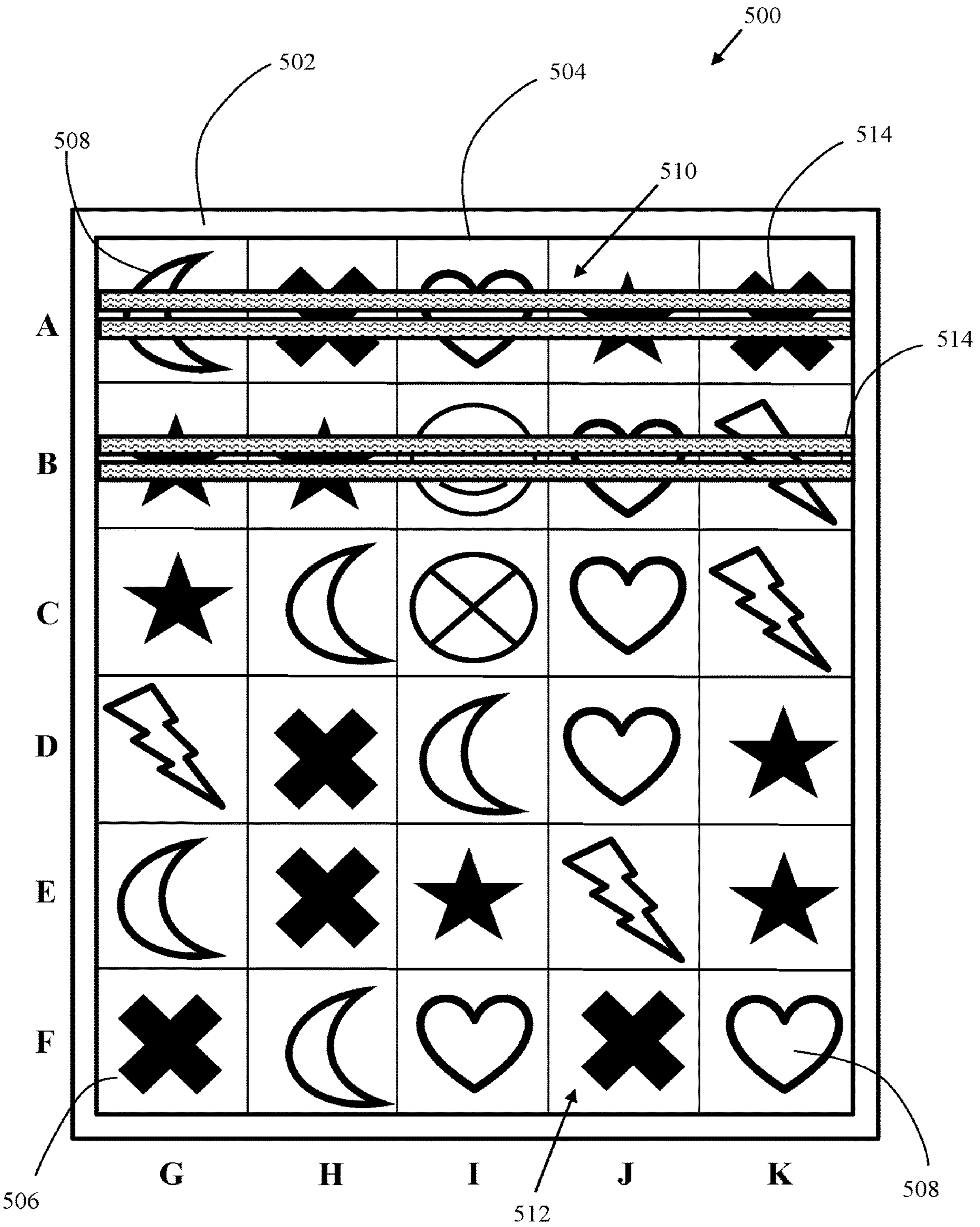
Figure 13:
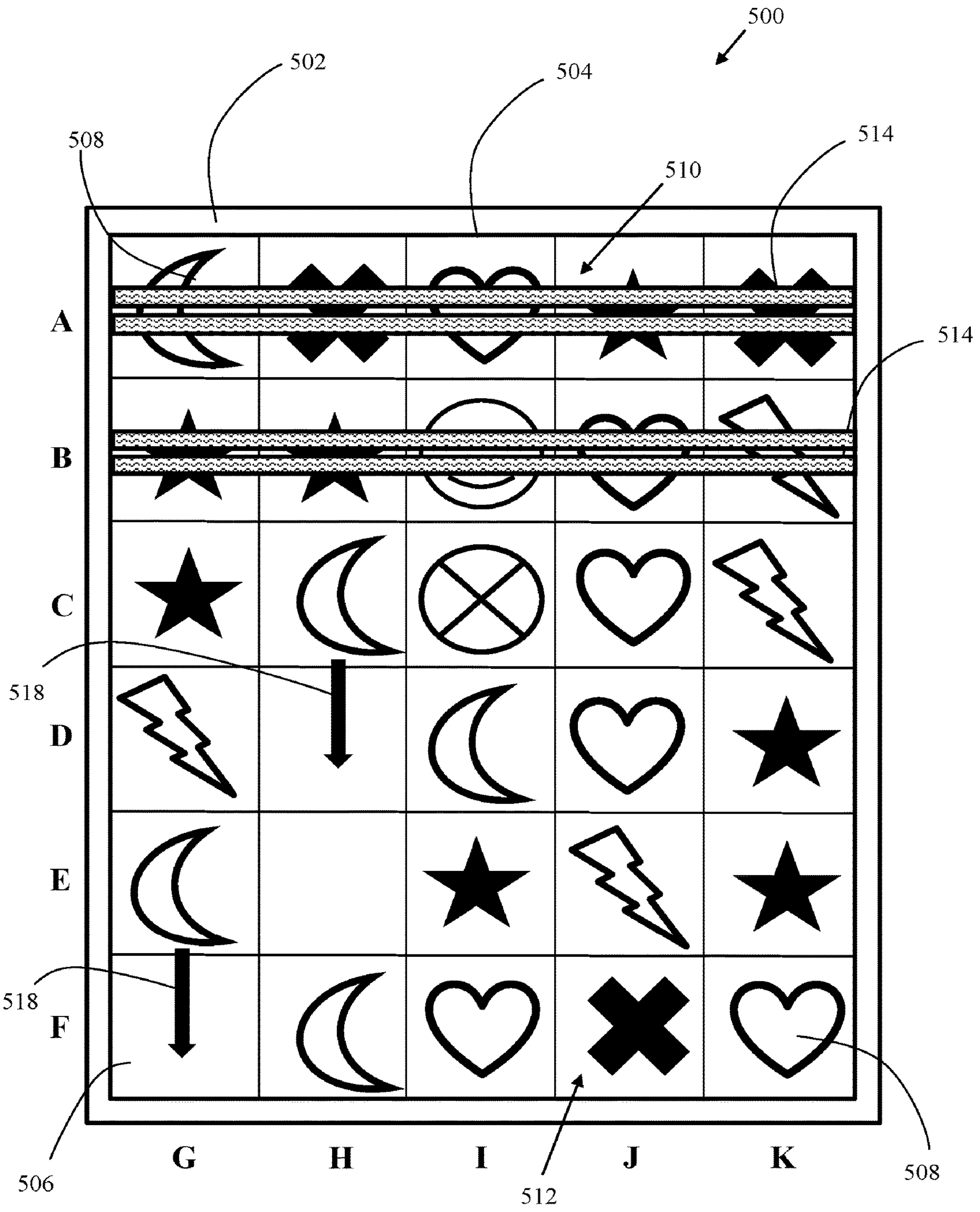
Figure 14:
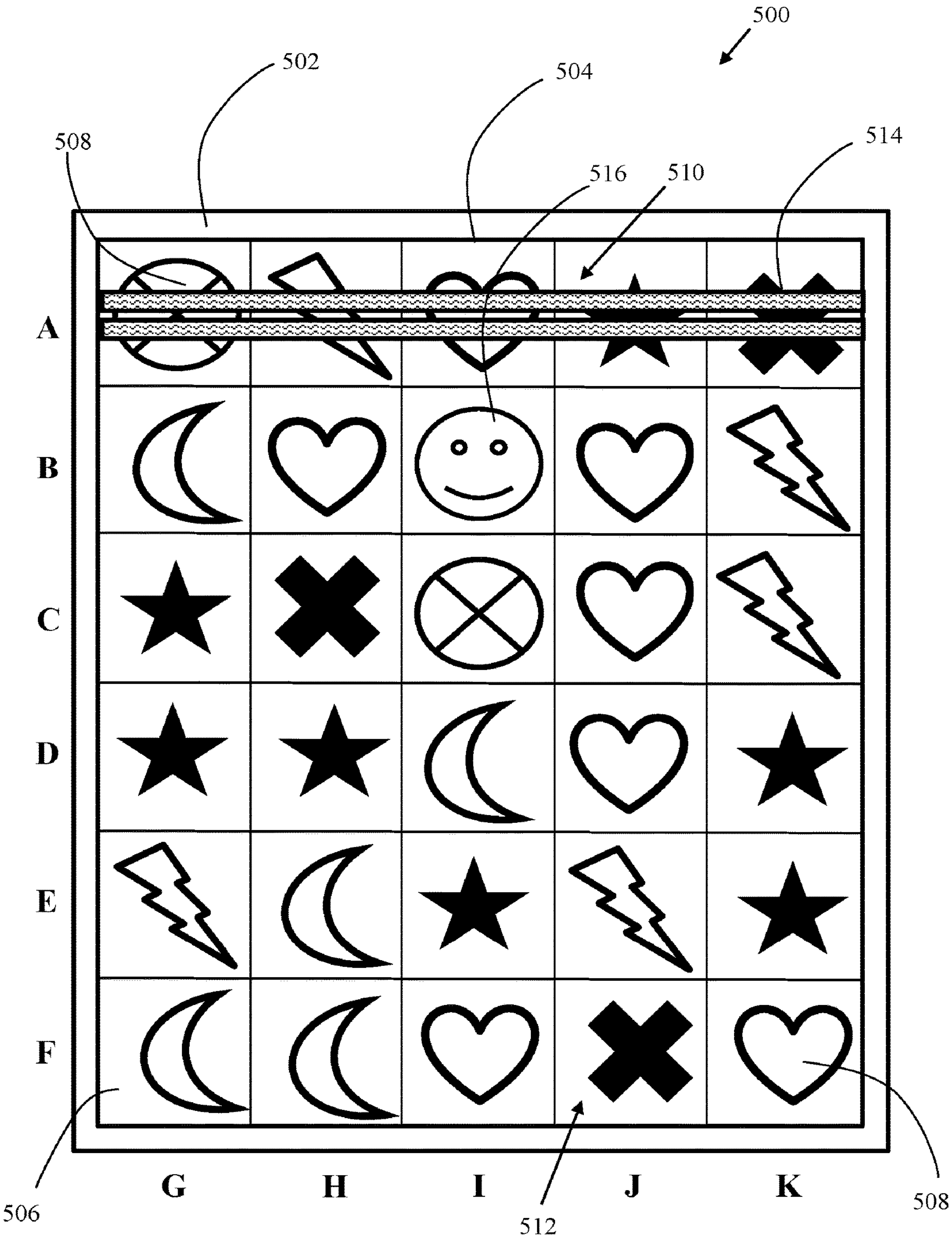
Figure 15:
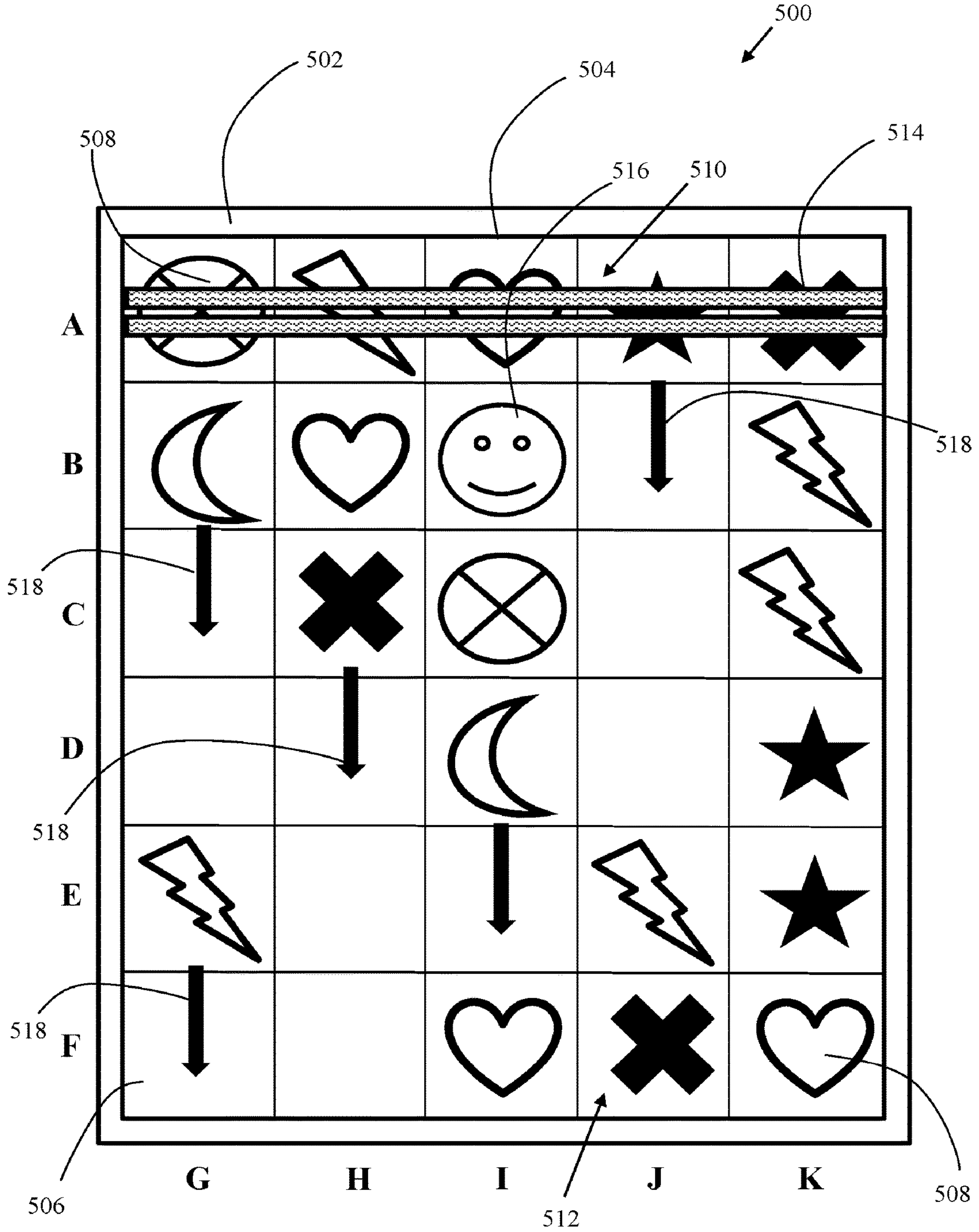

As shown in FIG. 12, the movement of symbols and inclusion of row C in the active symbol display area 512 puts three "X" symbols 508 adjacent to one another in rows D, E and F of columns G and H. This configuration activates the first game feature once again. As discussed above, the three "X" symbols are removed as shown in FIG. 13. As shown in FIG. 14, symbols 508 above the removed "X" symbols directly above move downward and the graphical element 514 across row B is removed so that rows B and C are now part of the active symbol display area 512, thus forming a 5×5 grid of symbols for consideration in the game result. In this embodiment, symbol 516 is a special bonus symbol thus entitling the player to a bonus award which the player would not have received if the game feature had not been activated twice. In this embodiment, after the bonus is received symbol 516 disappears and is no longer displayed, thus allowing the symbol 508 above to move downward into the vacated cell 506. In addition, three "heart" symbols 508 are now adjacent one another in column J along with three "star" symbols 508 and three "half-moon" symbols 508, thus resulting in these symbols being removed and activating the game feature again, as shown in FIG. 15.

Figure 16:
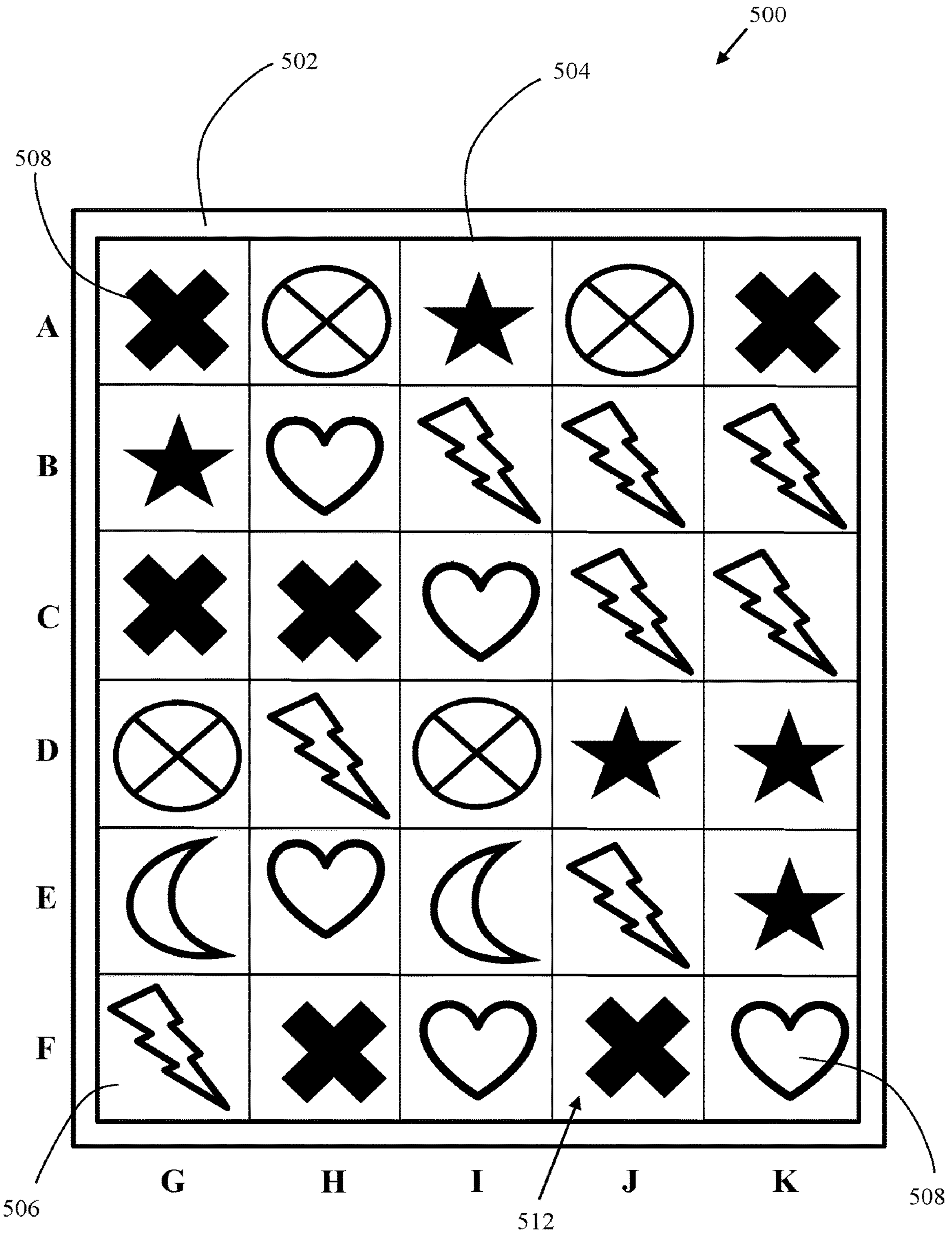
Figure 17:
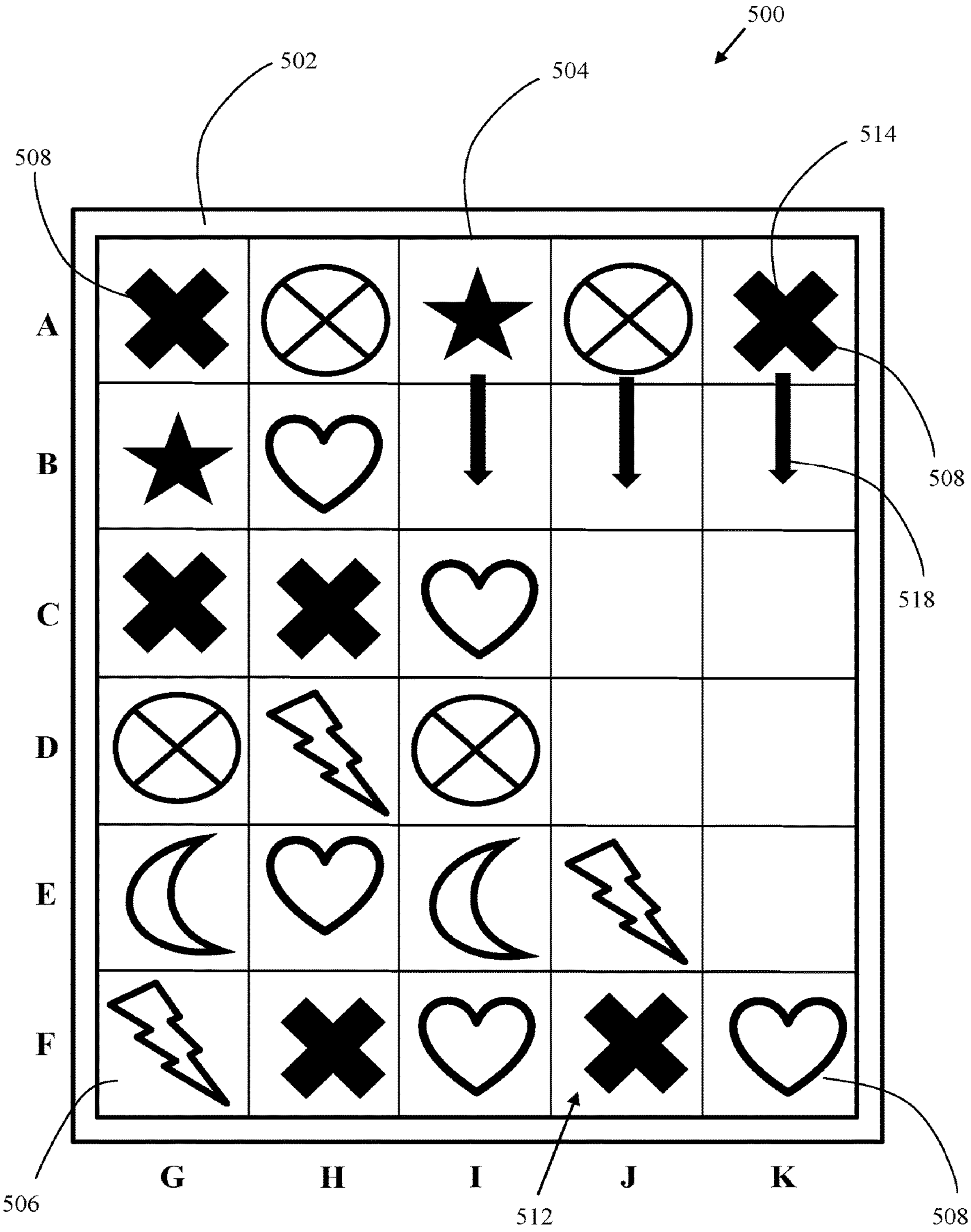
Figure 18:
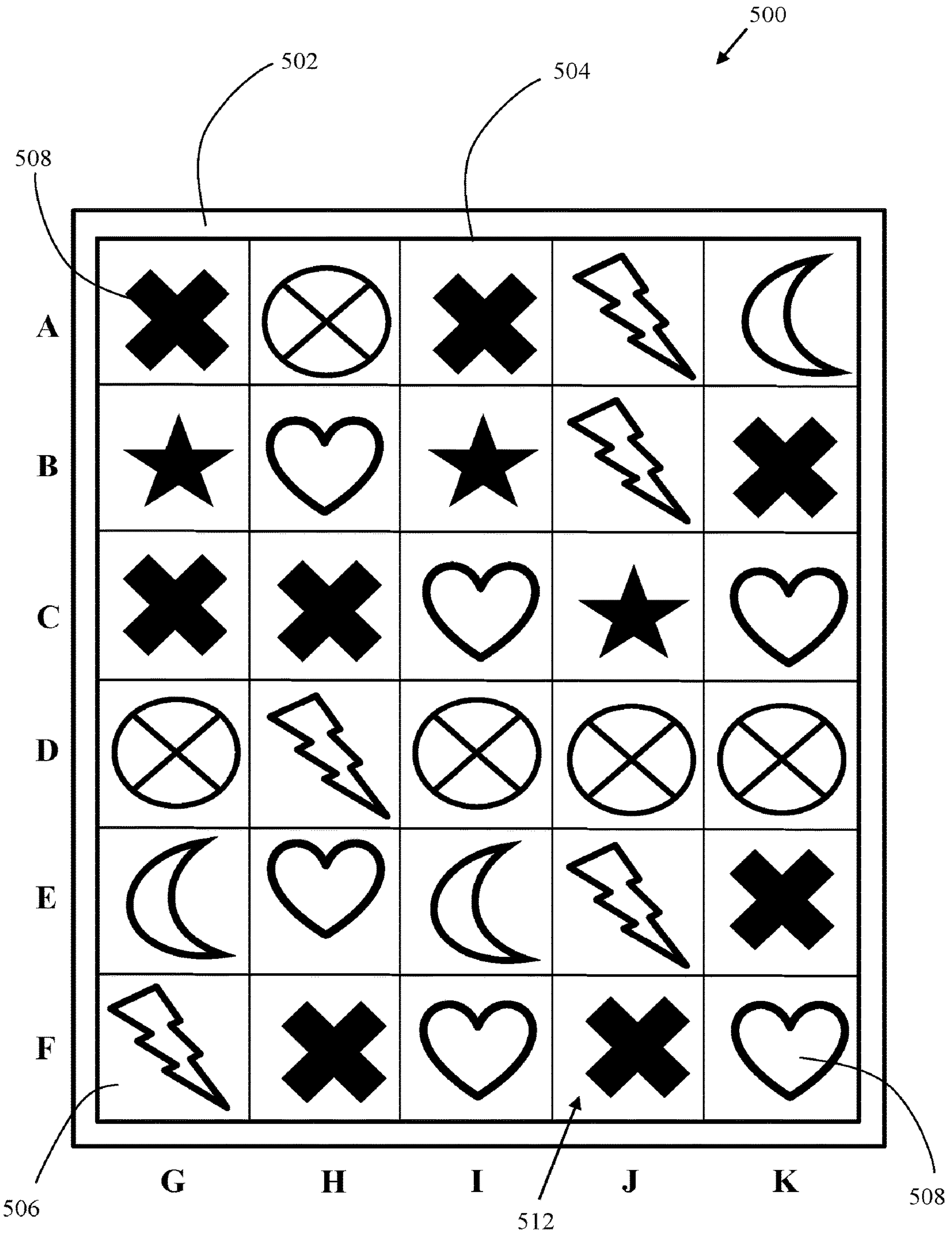
Figure 19:
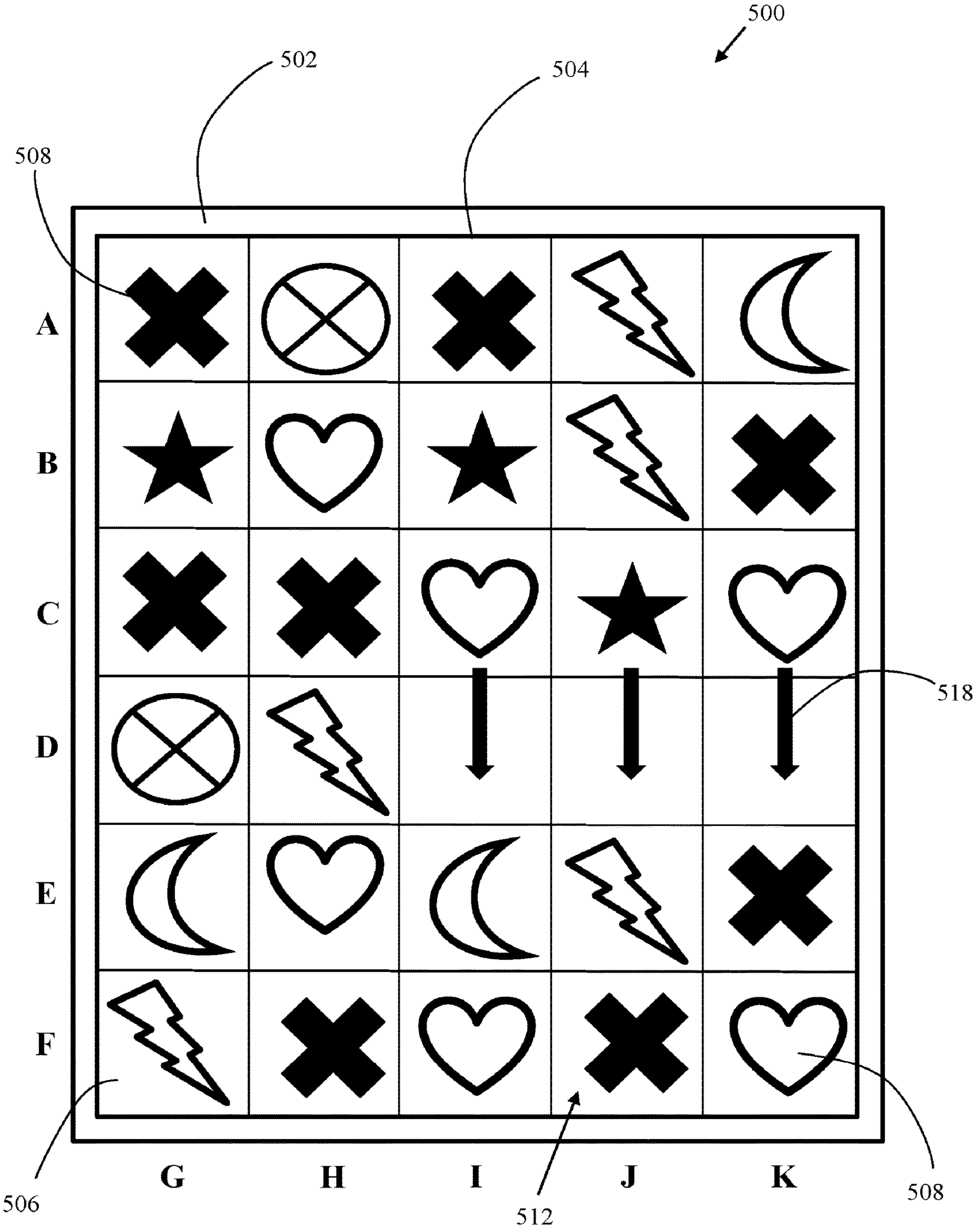
Figure 20:
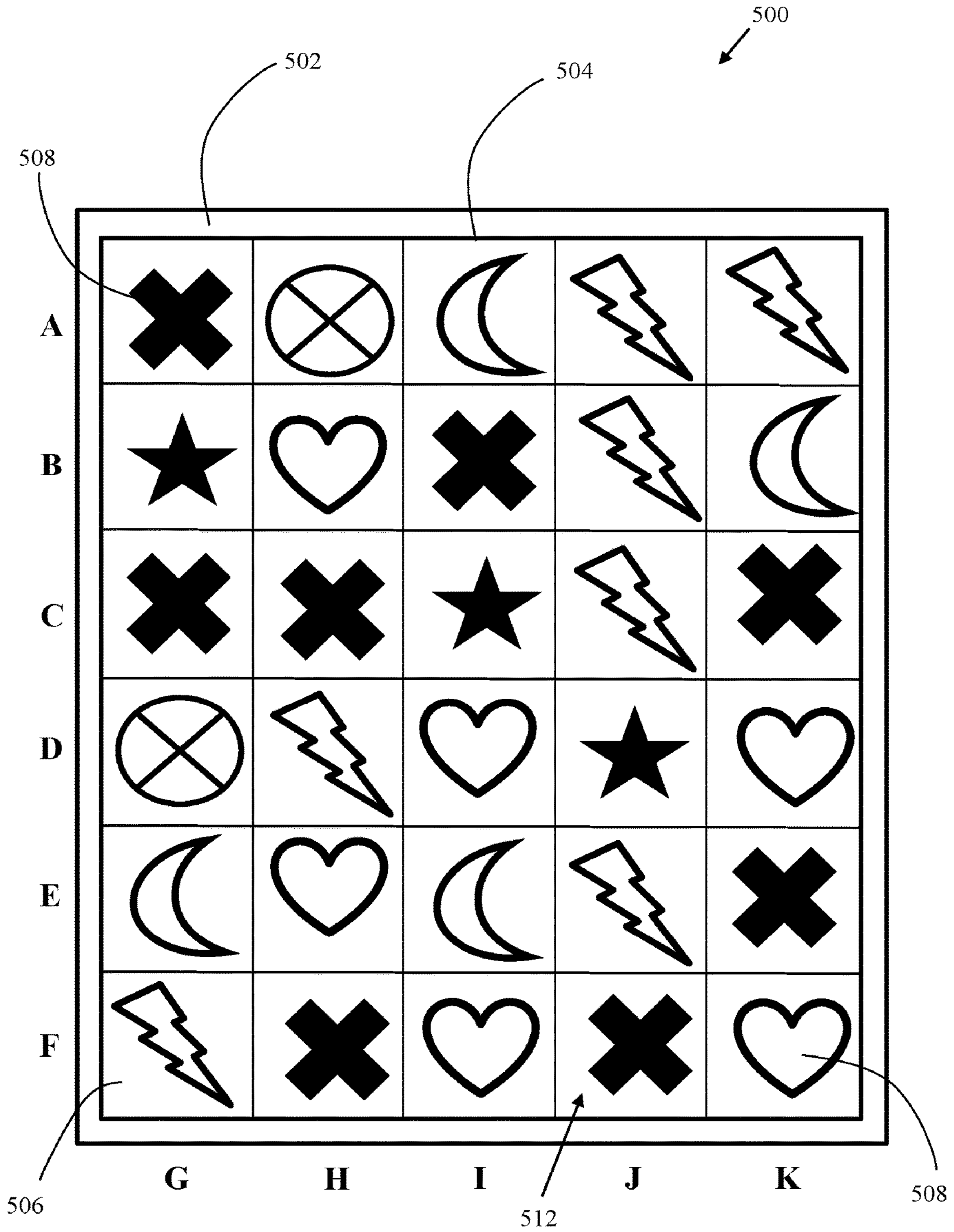
Figure 21:
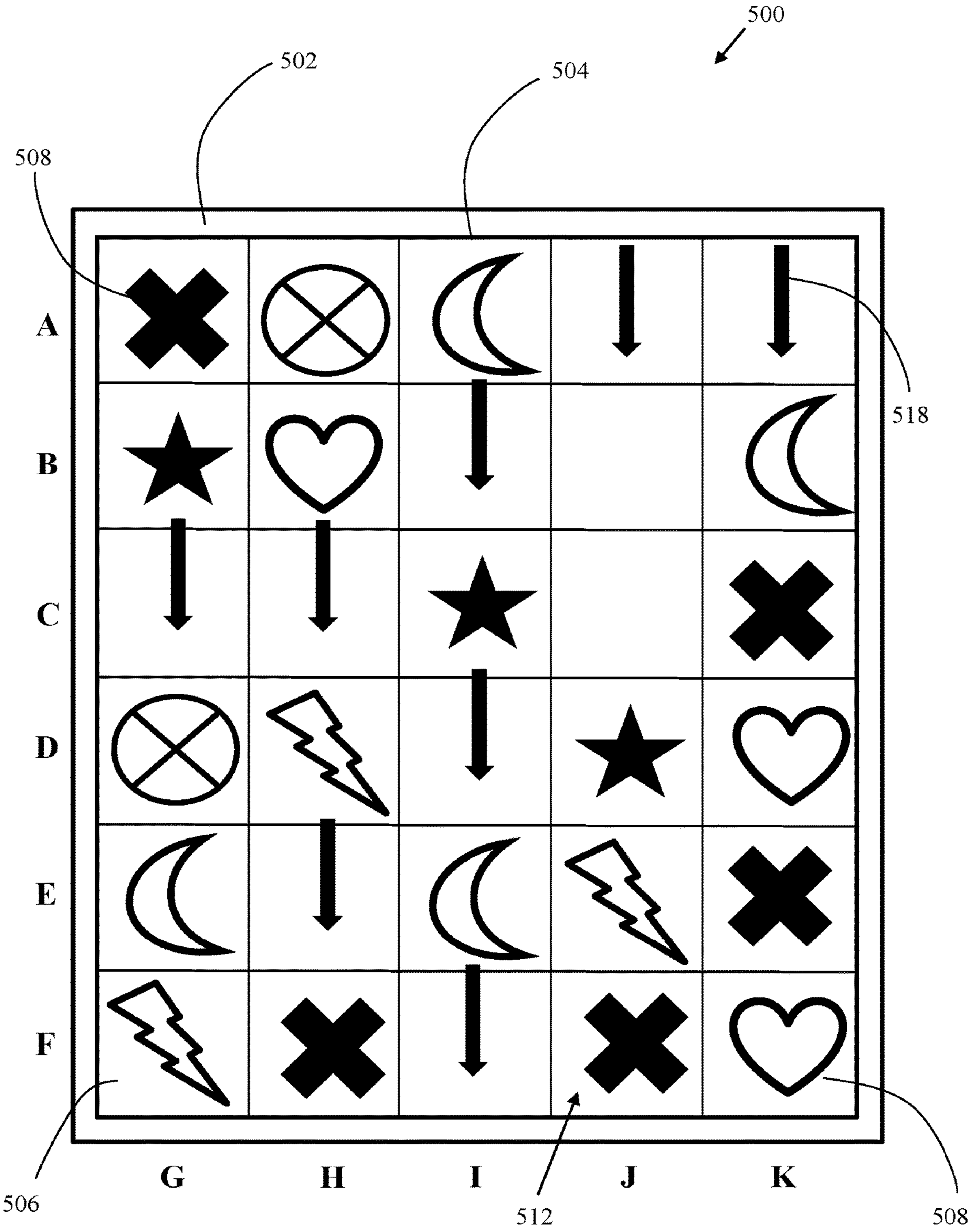

The removal of the matching symbols 508 and movement of other symbols 508 into the subsequently vacated cells 506 continues and pursuant to the game feature being activated graphical element 514 covering row A is removed. Thus, the active symbol display area 512 increases to a 6×5 grid as shown in FIG. 16 with all symbols 508 therein being considered for purposes of determining the game result. As also shown in FIG. 16, additional symbols, such as the five "lightning bolt" symbols 508 in rows B and C and the three "star" symbols 508, are matched by being in adjacent cells 506, thus continuing the game play of removal of symbols 508 and moving symbols 508 into the vacated cells 506 in the same game result.

Figure 22:
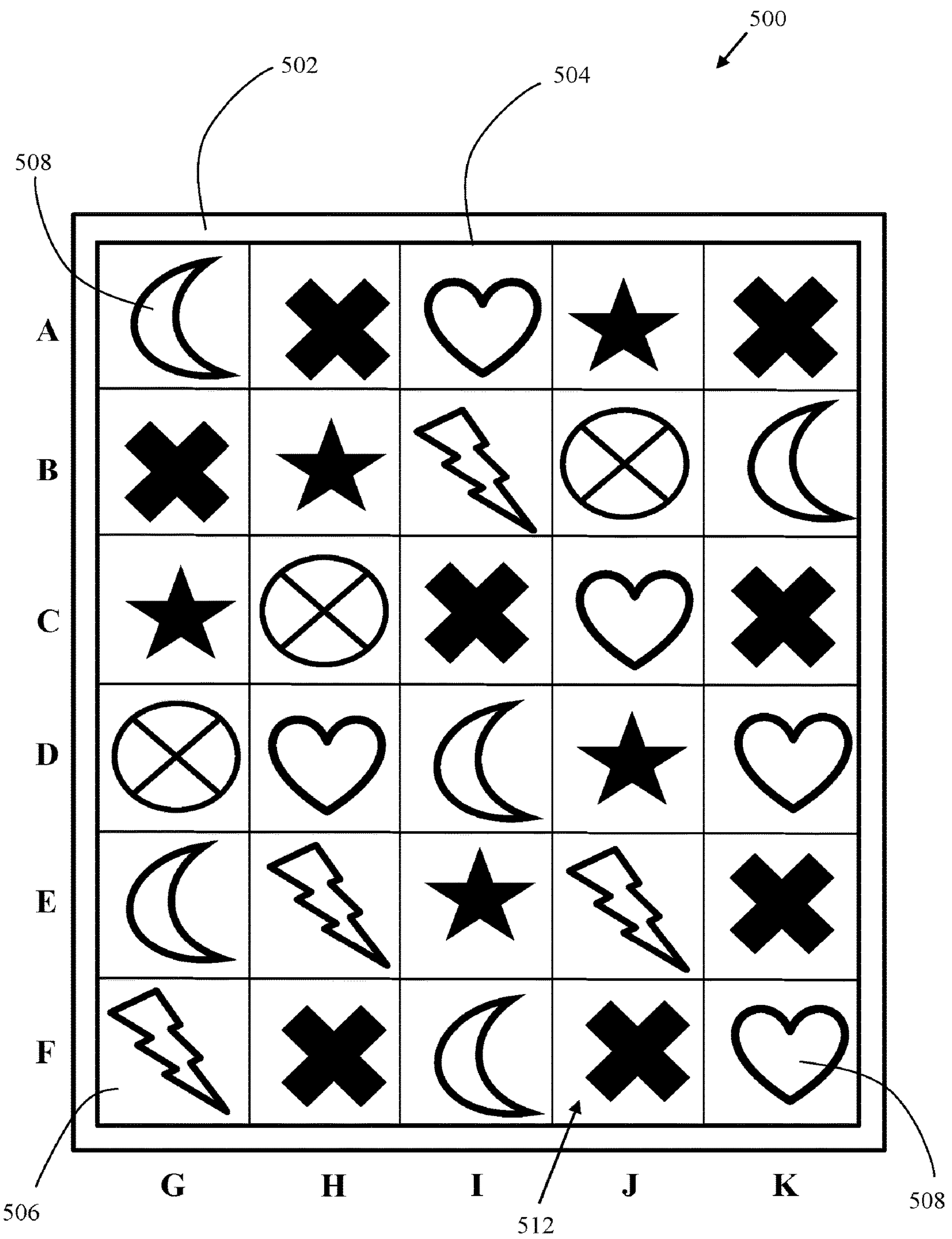

As shown in FIGS. 17, 18, 19, 20 and 21 symbols 508 continue to be eliminated after having moved into positions in which three or more of the same symbols 508 match until as shown in FIG. 22 no further symbols may be eliminated. Award outcomes based on the game outcome may be enhanced upon each modification of the game outcome. In this embodiment, when no further symbols 508 may be eliminated, the final game result will be determined. If any special symbols 516 are displayed in grid 506, such as scatter symbols, these will be counted and credits will be awarded. Additionally, if more than a preset amount of special symbols 516 are displayed in 506, bonus or free games 502 may be automatically triggered using the largest sized grid, which as shown in this embodiment is a 6×5 grid. Once the final game result is determined, the first game feature will be deactivated and game 502 returns to the initial state with inactive symbol display area 510 being established as the entirety of rows A, B and C.

In some embodiments, this feature occurs randomly throughout the game while in other embodiments this feature randomly occurs during a bonus round, or in both. In some embodiments, the feature occurs when wagering at a higher level or amount, or the probability of the feature occurring is increases based on the wager level. For example, wagering at the highest level five may unlock the greatest amount of cell positions, such as increasing from a 3×5 grid to a 6×5 grid.

In some embodiments the feature is triggered by outcomes in the base game. For example, one row at a time may be unlocked in the inactive symbol display area responsive to successive instances of a preset amount of the same symbols appearing adjacent to one another in a 3×5 grid area, which then forms a 4×5 and then a 5×5 grid, up to a 6×5 grid area as rows in the inactive symbol display area are included in the active symbol display area with the payout award being recalculated based on the game outcome including the additional symbols. In other words, an additional row is added to the grid after each occurrence of a triggering event, that is, each instance of three or more of the same symbols appearing adjacent to one another in the results, which impacts the game outcome.

In some embodiments the game will continue to play responsive to the triggering event continuing to occur until a maximum amount of the inactive symbols display area has been made active. After the maximum active state is reached the matching symbols will be eliminated and replaced until no more matching is possible. The game outcome will then be determined and on the next instance of game play (i.e., the next spin) the game will begin in the initial state with the full inactive symbol display area being once again established until a subsequent occurrence of a triggering event.

Some embodiments of the invention may include a bonus round of free spins in which after each portion of the inactive symbol display area is made active it remains active for subsequent free spins without returning to inactive as in the base game. Thus, during free spins, all the inactive cells may be unlocked and made active and game play will continue over multiple game outcomes with all of inactive cells active for each of the free spins, therefore resulting in a higher probability of possible winning outcomes for the player. In this embodiment, three or more symbols, horizontally or vertically adjacent to one another, trigger the feature, which results in the matching symbols disappearing and any symbols above moving or falling down as if acted upon by gravitational forces to fill the cells now voided by the symbols having disappeared. This further results in the unlocking of the hidden reels above.

It should be appreciated that the reels may be associated with any suitable feature or features. For example, in various embodiments, one or more of the reels includes a higher concentration of high value symbols or special symbols (such as major symbols, wild symbols, and/or bonus symbols) than low value symbols or includes one or more scatter symbols that, if generated and displayed for a play of the slot game, cause the gaming system to provide a scatter award.

It should be appreciated that any suitable number of the reels may be associated with at least one game feature described herein. For instance, one embodiment, only one of the reels is associated with at least one feature. In another embodiment, a plurality of, but less than all of, the reels are each associated with at least one feature. In another embodiment, at least one of the reels is not associated with any feature. In another embodiment, at least one of the reels is associated with a plurality of different features.

In various embodiments, upon the occurrence of the game feature, the gaming system provides at least one additional free play of the slot game. It should be appreciated that the game feature may be activated by any suitable event. In one embodiment, the game feature occurs when a designated quantity of at least one special activation symbol is generated and displayed in a game outcome of the slot game or over multiple game outcomes during game play. In another embodiment, the game feature occurs when the player collects a designated quantity of special symbols in the same play of the slot game or over a plurality of different plays of the slot game.

In some embodiments, the game feature is activated, or the probability of activating the game feature is increased, to increase the average expected payback percentage of current or subsequent play of the slot game.

It should be appreciated that the quantity of reels associated with the slot game, the quantity of active and inactive symbol display areas; the quantity of active and inactive symbol display areas with which each reel is associated, the specific winning symbol combinations, the frequency and criteria needed to be satisfied for activating a game feature, any increase in the average expected payback percentage upon the occurrence of the game feature, the application of the game feature in a bonus round or amount of the inactive symbol display area activated during a bonus round or free spins of the game, the probability of activation of the game feature and/or any other variable or determination described herein may be predetermined, randomly determined, randomly determined based on one or more weighted percentages, determined based on a generated symbol or symbol combination, determined based on a random determination by a central controller, determined based on a random determination at an electronic gaming machine (EGM), determined based on at least one play of at least one game, determined based on a player's selection, determined based on the wager placed, determined based on an amount of coin-in accumulated, determined based on a player tracking status of the player, determined based on one or more other determinations disclosed herein, determined independent of any other determination disclosed herein; and/or determined in any other suitable manner or based on or independent of any other suitable factor(s).

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XMIL database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the apparatus of the invention so long as it performs as described in at least one of the embodiments herein.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A gaming system, comprising:

a housing;

at least one display device supported by the housing, wherein the at least one display comprises an input device;

a random number generator;

a game server in communication with the random number generator and including at least one processor, and the game server including at least one non-transitory memory device that stores a plurality of executable instructions that, when executed by the at least one processor, cause the at least one processor to communicate with the at least one display device to:

(a) establish a credit balance based at least in part on a monetary value;

(b) place a wager to initiate play of a wagering game, the credit balance being decreasable by the wager;

(c) randomly display an outcome of an instance of play of the wagering game, wherein the displayed game outcome includes an active display area being determinative of an award outcome, and an inactive display area, the inactive display area being unused in the determination of the award outcome, the inactive display area being distinguishable from the active display area in the displayed game outcome by at least one identifying characteristic;

(d) determine an award associated with the active display area, the credit balance being increasable by any determined award outcome;

(e) responsive to the detection of an occurrence of a triggering event associated with the outcome of the instance of play of the wagering game:

(1) modify the displayed game outcome by discontinuing display of the at least one identifying characteristic in at least a portion of the inactive display area;

(2) determine an enhanced award outcome associated with the active display area of the modified game outcome, the active display area of the modified game outcome including the at least a portion of the inactive display area in which the display of the at least one identifying characteristic is discontinued; and (3) responsive to the detection of an occurrence of a triggering event in the modified game outcome, repeat (1) and (2), whereby the display of the at least one identifying characteristic is discontinued in one or more additional portions of the inactive display area;

(f) responsive to at least one of (i) the absence of the detection of an occurrence of a triggering event in the modified game outcome and (ii) the discontinuing of the display of the at least one identifying characteristic in all portions of the inactive display area of the modified game outcome, increase the credit balance by the determined enhanced award outcome; and (g) initiate a payout of the credit balance in response to receipt of a payout request.

2. The gaming system of claim 1, wherein the displayed game outcome includes one or more symbols from a plurality of symbols in the active display area and one or more symbols from the plurality of symbols in the inactive display area.

3. The gaming system of claim 2, wherein the award outcome is determined by the plurality of symbols in the active display area.

4. The gaming system of claim 3, wherein the triggering event comprises an occurrence of a predefined symbol from the plurality of symbols in the active display area.

5. The gaming system of claim 4, wherein the triggering event comprises two or more of the predefined symbol in a preset configuration in the active display area.

6. The gaming system of claim 4, wherein the occurrence of the predefined symbol in the active display area further comprises at least three of the predefined symbol.

7. The gaming system of claim 1, wherein the at least one identifying characteristic comprises obscuring at least a portion of the inactive display area.

8. The gaming system of claim 1, further comprising continuing to display the inactive display area without the at least one characteristic in one or more subsequent instances of the wagering game responsive to the discontinuing of the display of the at least one identifying characteristic in all portions of the inactive display area of the modified game outcome.

9. The gaming system of claim 1, further comprising displaying the at least one identifying characteristic in all of the inactive display area responsive to initiating play of a subsequent instance of the wagering game.

10. The gaming system of claim 1, wherein the displayed game outcome includes a depiction of virtual reels forming an array of multiple rows and multiple columns defining a plurality of cells therein.

11. The gaming system of claim 10, wherein the active display area includes a first plurality of cells in the array and the inactive display area includes a second plurality of cells in the array.

12. The gaming system of claim 11, wherein the displayed game outcome includes one or more symbols from a plurality of symbols in the active display area and one or more symbols from the plurality of symbols in the inactive display area.

13. The gaming system of claim 12, wherein the triggering event comprises an occurrence of one or more of at least one predefined symbol from the plurality of symbols in adjacently positioned cells of the active display area.

14. The gaming system of claim 12, wherein the triggering event comprises an occurrence of one or more of at least one predefined symbol in the active display area.

15. A gaming system, comprising:

at least one display device, wherein the at least one display device comprises one or more input devices;

a random number generator;

a game server including at least one processor;

and the game server in communication with the random number generator and including at least one computer-readable memory device that stores a plurality of executable instructions that, when executed by the at least one processor, cause the at least one processor to communicate with the at least one display device to:

(a) establish a credit balance associated with a monetary amount received as input from the one or more input devices;

(b) receive a wager to initiate play of a wagering game in response to actuation of a wager as input from the one or more input devices, the credit balance being decreasable by the wager;

(c) randomly display by the game server communicating with the random number generator and the at least one display device, an outcome of an instance of play of the wagering game, wherein the displayed game outcome includes an active display area and an inactive display area, the inactive display area being distinguishable from the active display area in the displayed game outcome by at least one identifying characteristic;

(d) determine by the game server the award outcome based on the active display area, the credit balance being increasable by the determined award outcome;

(e) responsive to an occurrence of a triggering event being detected by the game server in the active display area of the displayed game outcome:

(1) modify the displayed game outcome by discontinuing display of (i) the at least one identifying characteristic in at least a portion of the inactive display area;

(2) display a modified game outcome wherein (i) the active display area includes the at least a portion of the inactive display area in which the display of the at least one identifying characteristic is discontinued; and (3) responsive to an occurrence of the triggering event in the modified game outcome, repeat (1) and (2), whereby additional portions of the inactive display area are included in the active display area of the modified game outcome; and (f) responsive to the game server determining at least one of (i) the absence of an occurrence of the triggering event and (ii) the discontinuing of the display of the at least one identifying characteristic in at least a preset amount of the inactive display area of the modified game outcome, determine an enhanced award outcome associated with the active display area of the modified game outcome, the credit balance being increasable by the enhanced award outcome amount.

16. The gaming system of claim 15, wherein the at least one identifying characteristic comprises obscuring at least a portion of the inactive display area.

17. The gaming system of claim 15, wherein the award outcome is determined responsive to at least one of (i) the absence of an occurrence of the triggering event and (ii) the discontinuing of the display of the at least one identifying characteristic in the entirety of the inactive display area.

18. The gaming system of claim 15, wherein the displayed game outcome includes one or more symbols from a plurality of symbols in the inactive display area.

19. The gaming system of claim 15, wherein the displayed game outcome includes one or more symbols from a plurality of symbols in the active display area.

20. The gaming system of claim 19, wherein the triggering event comprises an occurrence of one or more of at least one predefined symbol from the plurality of symbols in the active display area.

* * * * *